(12) United States Patent
Sukiman et al.

(10) Patent No.: US 7,788,345 B1
(45) Date of Patent: *Aug. 31, 2010

(54) RESOURCE ALLOCATION AND RECLAMATION FOR ON-DEMAND ADDRESS POOLS

(75) Inventors: Indrajanti Sukiman, Sunnyvale, CA (US); Hussein F. Salama, Sunnyvale, CA (US); Thomas E. Cramer, Jr., Lafayette, CA (US); Purnam Anil Sheth, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 1259 days.

This patent is subject to a terminal disclaimer.

(21) Appl. No.: 09/952,259

(22) Filed: Sep. 13, 2001

Related U.S. Application Data

(63) Continuation-in-part of application No. 09/874,520, filed on Jun. 4, 2001, now Pat. No. 7,197,549.

(51) Int. Cl.
G06F 15/177 (2006.01)
G06F 15/16 (2006.01)
G06F 15/173 (2006.01)

(52) U.S. Cl. ............ 709/220; 709/227; 709/226; 709/245

(58) Field of Classification Search ......... 709/219–224, 709/226, 227, 229, 245, 228, 249; 710/4, 710/9
See application file for complete search history.

(56) References Cited

U.S. PATENT DOCUMENTS 5,241,594 A 8/1993 Kung .................. 380/4
5,283,783 A 2/1994 Nguyen et al.
5,287,103 A 2/1994 Kasprzyk et al.

(Continued)

FOREIGN PATENT DOCUMENTS

WO 97/13352 4/1997

(Continued)

OTHER PUBLICATIONS

Active Software, Inc., "Active Software's Integration System", printed from http://www.activesw.com/products/products.html, on Jul. 24, 1998.

(Continued)

*Primary Examiner*—Kamal B Divecha
(74) *Attorney, Agent, or Firm*—Patent Capital Group

(57) ABSTRACT

A method for on-demand management of Internet Protocol (IP) address pools includes allocating an unused IP address from a local IP address pool designated for a remote domain if a request to connect to the remote domain is received and deallocating an IP address if the IP address is released. The local IP address pool includes at least one subnet dynamically assigned from a global IP address pool. Each of the subnets specifies a contiguous set of one or more IP addresses. IP addresses are allocated using a first-assigned-subnet-first policy, wherein an IP address is allocated from a least recently assigned subnet having at least one unallocated IP address. According to one aspect, subnets are deassigned using a last-assigned-subnet-first policy, wherein the deassigned subnet is the most recently assigned subnet having no allocated IP addresses.

46 Claims, 17 Drawing Sheets

U.S. PATENT DOCUMENTS

| | | | |
|---|---|---|---|
| 5,361,250 A | 11/1994 | Nguyen et al. | |
| 5,367,635 A | 11/1994 | Bauer et al. | 395/200 |
| 5,430,715 A | 7/1995 | Corbalis et al. | |
| 5,555,244 A | 9/1996 | Gupta et al. | |
| 5,561,703 A | 10/1996 | Arledge et al. | 379/57 |
| 5,581,478 A | 12/1996 | Cruse et al. | 364/505 |
| 5,592,538 A | 1/1997 | Kosowsky et al. | 379/93 |
| 5,610,910 A | 3/1997 | Focsaneanu et al. | 370/351 |
| 5,621,721 A | 4/1997 | Vatuone | 370/16 |
| 5,655,077 A | 8/1997 | Jones et al. | 395/187.01 |
| 5,671,354 A | 9/1997 | Ito et al. | 395/187.01 |
| 5,673,265 A | 9/1997 | Gupta et al. | |
| 5,678,006 A | 10/1997 | Valizadeh et al. | |
| 5,684,950 A | 11/1997 | Dare et al. | 395/187.01 |
| 5,699,521 A | 12/1997 | Iizuka et al. | 395/200.15 |
| 5,715,394 A | 2/1998 | Jabs | 395/200.11 |
| 5,717,604 A | 2/1998 | Wiggins et al. | 364/514 |
| 5,729,546 A | 3/1998 | Gupta et al. | |
| 5,734,654 A | 3/1998 | Shirai et al. | 370/396 |
| 5,740,176 A | 4/1998 | Gupta et al. | |
| 5,745,556 A | 4/1998 | Ronen | 379/127 |
| 5,764,736 A | 6/1998 | Shachar et al. | 379/93.09 |
| 5,764,756 A | 6/1998 | Onweller | 379/242 |
| 5,768,521 A | 6/1998 | Dedrick | 395/200.54 |
| 5,778,182 A | 7/1998 | Cathey et al. | 395/200.49 |
| 5,793,763 A | 8/1998 | Mayes et al. | |
| 5,799,017 A | 8/1998 | Gupta et al. | |
| 5,812,529 A | 9/1998 | Czarnik et al. | 370/245 |
| 5,835,720 A | 11/1998 | Nelson et al. | 395/200.54 |
| 5,835,725 A | 11/1998 | Chiang et al. | 395/200.58 |
| 5,835,727 A | 11/1998 | Wong et al. | 395/200.68 |
| 5,838,682 A | 11/1998 | Dekelbaum et al. | 370/401 |
| 5,838,683 A | 11/1998 | Corley et al. | 370/408 |
| 5,838,994 A | 11/1998 | Valizadeh | 395/876 |
| 5,845,070 A | 12/1998 | Ikudome | 395/187.01 |
| 5,852,812 A | 12/1998 | Reeder | 705/39 |
| 5,854,901 A | 12/1998 | Cole et al. | 395/200.75 |
| 5,867,495 A | 2/1999 | Elliott et al. | 370/352 |
| 5,889,774 A | 3/1999 | Mirashrafi et al. | 370/352 |
| 5,898,780 A | 4/1999 | Liu et al. | 380/25 |
| 5,905,736 A | 5/1999 | Ronen et al. | 370/546 |
| 5,913,037 A | 6/1999 | Spofford et al. | 395/200.56 |
| 5,918,016 A | 6/1999 | Brewer et al. | 395/200.5 |
| 5,922,051 A | 7/1999 | Sidey | 209/223 |
| 5,926,458 A | 7/1999 | Yin | 370/230 |
| 5,944,824 A | 8/1999 | He | 713/201 |
| 5,968,116 A | 10/1999 | Day, II et al. | 709/202 |
| 5,970,477 A | 10/1999 | Roden | 705/32 |
| 5,974,453 A | 10/1999 | Andersen et al. | 709/220 |
| 5,991,828 A | 11/1999 | Horie et al. | |
| 6,009,103 A * | 12/1999 | Woundy | 370/401 |
| 6,011,910 A | 1/2000 | Chau et al. | 395/200.59 |
| 6,018,619 A | 1/2000 | Allard et al. | 395/200.54 |
| 6,021,429 A | 2/2000 | Danknick | 709/202 |
| 6,026,087 A | 2/2000 | Mirashrafi et al. | 370/389 |
| 6,026,441 A | 2/2000 | Ronen | |
| 6,035,281 A | 3/2000 | Crosskey et al. | 705/14 |
| 6,052,725 A * | 4/2000 | McCann et al. | 709/223 |
| 6,055,236 A | 4/2000 | Nessett et al. | 370/389 |
| 6,091,951 A | 7/2000 | Sturniolo et al. | |
| 6,092,196 A | 7/2000 | Reiche | 713/200 |
| 6,119,160 A | 9/2000 | Zhang et al. | 709/224 |
| 6,141,687 A | 10/2000 | Blair | 709/225 |
| 6,178,455 B1 * | 1/2001 | Schutte et al. | 709/228 |
| 6,249,813 B1 * | 6/2001 | Campion et al. | 709/222 |
| 6,266,523 B1 | 7/2001 | Cook et al. | 455/403 |
| 6,282,575 B1 | 8/2001 | Lin et al. | |
| 6,295,283 B1 * | 9/2001 | Falk | 370/325 |
| 6,324,577 B1 * | 11/2001 | Hirai | 709/223 |
| 6,381,650 B1 * | 4/2002 | Peacock | 709/245 |
| 6,496,511 B1 * | 12/2002 | Wang et al. | 370/401 |
| 6,513,066 B1 * | 1/2003 | Hutton et al. | 709/227 |
| 6,564,216 B2 * | 5/2003 | Waters | 707/10 |
| 6,577,628 B1 * | 6/2003 | Hejza | 370/392 |
| 6,587,455 B1 * | 7/2003 | Ray et al. | 370/352 |
| 6,618,757 B1 * | 9/2003 | Babbitt et al. | 709/226 |
| 6,697,360 B1 * | 2/2004 | Gai et al. | 370/389 |
| 6,763,012 B1 * | 7/2004 | Lord et al. | 370/338 |
| 6,795,709 B2 * | 9/2004 | Agrawal et al. | 455/452.1 |
| 6,799,204 B1 | 9/2004 | Baba et al. | |
| 6,880,000 B1 * | 4/2005 | Tominaga et al. | 709/220 |
| 6,988,148 B1 * | 1/2006 | Sheth | 709/245 |
| 7,197,549 B1 * | 3/2007 | Salama et al. | 709/223 |
| 7,254,630 B1 * | 8/2007 | Daude et al. | 709/224 |
| 7,302,484 B1 * | 11/2007 | Stapp et al. | 709/226 |
| 7,367,046 B1 * | 4/2008 | Sukiman et al. | 726/2 |
| 7,587,493 B1 * | 9/2009 | Sheth | 709/226 |
| 2001/0025312 A1 * | 9/2001 | Obata | 709/226 |
| 2001/0044893 A1 * | 11/2001 | Skemer | 713/153 |
| 2002/0013847 A1 | 1/2002 | Fisher et al. | 709/226 |
| 2002/0138614 A1 | 9/2002 | Hall | 709/225 |
| 2002/0155827 A1 | 10/2002 | Agrawal et al. | |
| 2002/0156914 A1 | 10/2002 | Lo et al. | |
| 2003/0105976 A1 | 6/2003 | Copeland, III | |
| 2003/0115345 A1 * | 6/2003 | Chien et al. | 709/229 |
| 2004/0128144 A1 | 7/2004 | Johnson et al. | |

FOREIGN PATENT DOCUMENTS

| | | |
|---|---|---|
| WO | 97/13382 | 4/1997 |
| WO | 99/53408 | 10/1999 |
| WO | WO/ 01/17199 | 3/2001 |
| WO | WO 01/17199 A1 * | 3/2001 |

OTHER PUBLICATIONS

Alexander, S., "DHCP Optios and BOOTP Vendor Extensions," Network Working Group, RFC 1533, Oct. 1993.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

Cisco Systems, Inc., "Cisco DNS/DHCP Manager V.1.1", printed from http://www.combinet.com/warp/public/751/dnsmg/dnsmg_ds.htm, on Sep. 10, 1998, 4 pages.

Droms, R., "Dynamic Host Configuration Protocol," Network Working Group, RFC 1531, Oct. 1993.

IBM, "IBM introduces new subscriber management system for Internet service providers", Dec. 2, 1998, IBM News, p. 1.

Network Registrar, "Regain Confidence and Control Over Your IP Address Infrastructure", American Internet Corporation, Bedford, MA.

Network Registrar, "Hot Products & Solutions—IP Address Management: A White Paper", American Internet Corporation, Bedford, MA, printed from http://www.american.com/ip-mgmt.html, on Jul. 24, 1998.

"Network Address Translation Information", printed from http://www.uq.edu.au/~gadmacka/content/natinformation.htm, on Sep. 19, 1998.

Rigney, et al., "Remote Authentication Dial In User Service (RADIUS)", Network Working Group, RFC 2138, Apr. 1997, pp. 1-57.

"Three Ways to Manage IP Addresses", PC Magazine: IP Address Management, printed from htto://www.zdnet.com/pcmag/features/ipmanage/ip-s2.htm, on Sep. 10, 1998.

Cisco Systems, Inc., "Cisco DNS/DHCP Manager V.1.1," 7 pages; printed from http://www.combinet.com/warp/public/751/dnsmg/dnsmg_pa.htm, on Sep. 10, 1998.

Cisco Systems, Inc., "DHCP Solution Helps Scale and Configure IP Nodes in Growing Switched Networks," 2 pages; printed from http://cio.cisco.co.jp/warp/public/795/6.html, on Sep. 10, 1998.

\* cited by examiner

RESOURCE ALLOCATION AND RECLAMATION FOR ON-DEMAND ADDRESS POOLS

CROSS-REFERENCE TO RELATED APPLICATIONS

This application is a continuation-in-part of application Ser. No. 09/874,520, filed Jun. 4, 2001 now U.S. Pat. No. 7,197,549 in the name of inventors Hussein Salama and Purnam Sheth, entitled "On-demand Address Pools", commonly assigned herewith.

FIELD OF THE INVENTION

The present invention relates to the field of data communications. More particularly, the present invention relates to a system and method for resource allocation and reclamation for on-demand address pools.

BACKGROUND OF THE INVENTION

The growth of the Internet appears to be exponential. Tens of thousands of networks are now connected to the Internet and the number is close to doubling every year. Unfortunately, however, Internet Protocol (IP) addresses are not infinite and it is rather expensive to procure more IP addresses. With the increase in the number of users of the Internet, Telcos (Telecommunication companies) and ISPs (Internet Service Providers) are faced with an increasing shortage of IP addresses.

Each service to which a user may be connected has an associated IP address space. That is, a certain range of addresses may address that space. The range may be contiguous, discontiguous, or a combination of both. For example, Corp A may have an intranet service having all IP addresses which start with "10.1"—this may be denoted "10.1.x.x" where x can be any value between 0 and 255. It may also be denoted "10.1.0.0; 255.255.0.0" where "10.1.0.0" represents the IP address and "255.255.0.0" represents the subnet mask. Those of skill in the art will recognize that a 255 in the subnet mask field represents a binary 1111 1111 and amounts to a requirement that the corresponding field of the IP address must match bit for bit in order to achieve a match. On the other hand, a 0 in the subnet mask field represents a binary 0000 0000 and amounts to no requirement for any match. For example, a service having an address space of "0.0.0.0; 0.0.0.0" represents the Internet, i.e., all IP addresses are within this space. Note that since the subnet mask is 0.0.0.0 the IP address could be set to any value and it would yield the same result.

The Dynamic Host Configuration Protocol (DHCP) has been developed to provide an automated assignment of IP addresses and to help solve the shortage of IP addresses. Conventional DHCP operation is as follows: When a DHCP client computer attempts an Internet connection, it broadcasts a DHCP request asking for any DHCP server on the network to provide it with an IP address and configuration parameters. A DHCP server on the network that is authorized to configure this client will offer an IP address by sending a reply to the client. Upon receiving this offer, the client may decide to accept it or wait for additional offers from other DHCP servers on the network. At the end, the client chooses and accepts one offer, and the chosen DHCP server sends an acknowledgement with the offered IP address having an associated "lease" time (and any other configuration parameters the client might have requested). During the lifetime of the lease, the client will repeatedly ask the server to renew. If the client chooses not to renew or if the client machine is shut down, the lease eventually expires. Once the lease expires, the IP address can be "recycled" and given to another machine.

The RADIUS (Remote Authentication Dial In User Service) protocol is typically used to authenticate a user and to associate the user with a remote domain and associated routing table. Like DHCP, RADIUS can also be used to assign an IP address to a remote user.

Point-to-Point Protocol (PPP) sessions are typically terminated on a home gateway at a remote domain and the owner of the remote domain is responsible for address assignment. In this case, the home gateway is configured so as to implement DHCP-like functionality with IP address pools so as to dynamically allocate IP addresses. The home gateway distributes IP addresses to users (end-users of the Telco or ISP) when the users log-in. The home gateway also revokes IP addresses when the users log-out, making those IP addresses available to other users.

The network edge is the point where customer traffic enters a service provider's network. Traffic can arrive at the edge via access technologies including dial, IP, ATM, Frame Relay, leased line, wireless, Digital Subscriber Line (xDSL) and cable. An edge switch or edge router aggregates traffic from all or some of these access interfaces and forwards packets over a multiplexed packet network core.

Service providers have begun handling management of IP addresses for owners of remote domains. In these cases, PPP sessions are terminated at the service provider's premises on an edge router. The owner of the remote domain provides the service provider with a pool of IP addresses to manage on behalf of the remote domain. An edge router of the service provider assigns IP addresses to remote users (users of the remote domain) as needed. Whenever an edge router assigns an IP address to a remote user, it must insert a route to that user in a routing table designated for the remote domain. This update must be propagated to corresponding routing tables in each edge router in the network. This is explained below in more detail with reference to FIG. 1.

FIG. 1 is a flow diagram that illustrates a typical method for allocating IP addresses. At 100, a service provider receives a pool of IP addresses from an owner of a remote domain such as a virtual private network. At 105, each pool of IP addresses is divided into per-remote domain local IP address pools on each edge router that is configured to accept PPP sessions from remote users of the remote domain. At 110, a determination is made regarding whether an IP address request from a remote user has been received. If an IP address request from a remote user has been received, at 115 an unused IP address from a local IP address pool designated for the remote domain being connected to is assigned to the remote user. At 120, a route to the remote user is inserted into the corresponding edge router routing table. If an IP address request from a remote user has not been received, at 125 a determination is made regarding whether an IP address has been returned. If an IP address has been returned, the IP address is returned back to its designated IP address pool at 130 and the route to the remote user is removed from the corresponding routing table at 135.

However, maintaining routing information for each IP address is expensive with respect to network bandwidth consumption because each time an address is added or removed, the event must be broadcast so that other network entities know which edge router is handling the address. Moreover, this problem of bandwidth consumption increases and becomes more acute during peak use hours. Additionally, the routing tables grow larger and more difficult to manage as the size of the network grows.

An improvement is made possible by statically configuring local IP address pools on each edge router. Each edge router includes at least one local IP address pool designated for a remote domain. Each edge router also includes a routing table for each remote domain supported by the edge router. Local IP address pools are divided into groups of contiguous IP addresses or subnets. Summarized routes corresponding to all subnets in an address pool are inserted into the edge router routing table associated with the pool. Local IP address pools allow relatively efficient route summarization because fewer routing table updates are required. This is explained below in more detail with reference to FIG. 2.

FIG. 2 is a flow diagram that illustrates an improved method for allocating IP addresses using statically configured local IP address pools. At 200, a service provider receives a pool of IP addresses from a remote domain to manage on behalf of the remote domain. At 205, each pool of IP addresses is divided into per-remote domain local IP address pools on each edge router that is configured to accept PPP sessions from remote users of the remote domain. At 210, summarized routes corresponding to subnets in the address pool are statically inserted into the routing table associated with the pool. At 215, a determination is made regarding whether an IP address request has been received from a remote user. If an IP address request has been received, at 220 an unused IP address is allocated from a local IP address pool designated for the remote domain being connected to. If an IP address has not been received, at 225 a determination is made regarding whether an IP address has been returned. If an IP address has been returned, at 230 the IP address is returned to its designated IP address pool.

Unfortunately, statically configured local IP address pools have their own disadvantages. It is possible to overutilize IP addresses for one edge router-remote domain combination while simultaneously underutilizing IP addresses for another edge router configured to accept connections for the same remote domain. For example, suppose edge router 1 and edge router 2 are configured with 10 IP addresses each for connections to a particular remote domain. Once edge router 1 allocates all 10 IP addresses, further requests to edge router 1 from remote users of the remote domain will result in denial of service, even if edge router 2 has allocated only 2 of its 10 IP addresses.

As mentioned above, both the DHCP and RADIUS protocols can be used to assign IP addresses. However, these protocols assign a host address to a remote user. The edge router can be configured to autosummarize the host routes before redistributing them. Unfortunately, route summarization is inefficient in this case because remote users log on and off indeterminately, making it difficult to have a contiguous set of IP addresses that can be summarized. Furthermore, it takes time to propagate a newly inserted route to all edge routers. A remote user has limited connectivity during this period. Another disadvantage is that updates must be sent to each edge router whenever a remote user logs on or off.

What is needed is a solution that provides dynamic and relatively efficient allocation of remote domain IP addresses between one or more edge routers. A further need exists for such a solution that uses open and well-understood standards.

BRIEF DESCRIPTION OF THE INVENTION

A method for on-demand management of Internet Protocol (IP) address pools includes allocating an unused IP address from a local IP address pool designated for a remote domain if a request to connect to the remote domain is received and deallocating an IP address if the IP address is released. The local IP address pool includes at least one subnet dynamically assigned from a global IP address pool. Each of the subnets specifies a contiguous set of one or more IP addresses. IP addresses are allocated using a first-assigned-subnet-first policy, wherein an IP address is allocated from a least recently assigned subnet having at least one unallocated IP address. According to one aspect, subnets are deassigned using a last-assigned-subnet-first policy, wherein the deassigned subnet is the most recently assigned subnet having no allocated IP addresses. According to another aspect, subnet assignment is triggered by an IP address allocation event. According to another aspect, subnet deallocation is triggered by an IP address deallocation event.

An apparatus for on-demand management of Internet Protocol (IP) address pools includes an allocator to allocate an unused IP address from a local IP address pool designated for a remote domain if a request to connect to the remote domain is received and a deallocator to deallocate an IP address if the IP address is unused. The local IP address pool includes at least one subnet dynamically assigned from a global IP address pool. Each of the subnets specifies a contiguous set of one or more IP addresses. LP addresses are allocated using a first-assigned-subnet-first policy. The allocator and the deallocator are coupled to the local IP address pool and a global IP address pool interface.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION OF A PREFERRED EMBODIMENT

Figure 1:
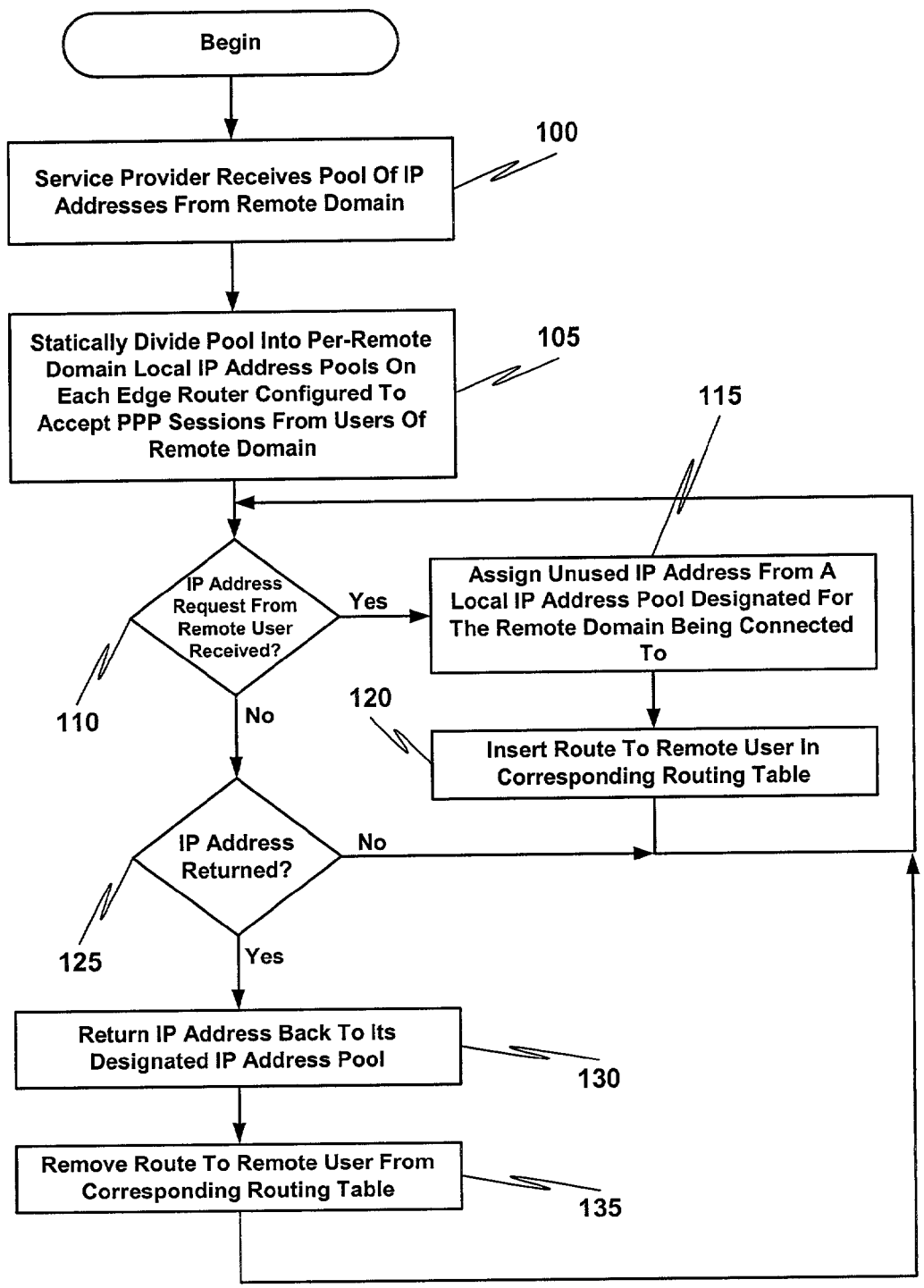
FIG. 1 is a flow diagram that illustrates a method for managing remote domain IP address pools.
Figure 2:
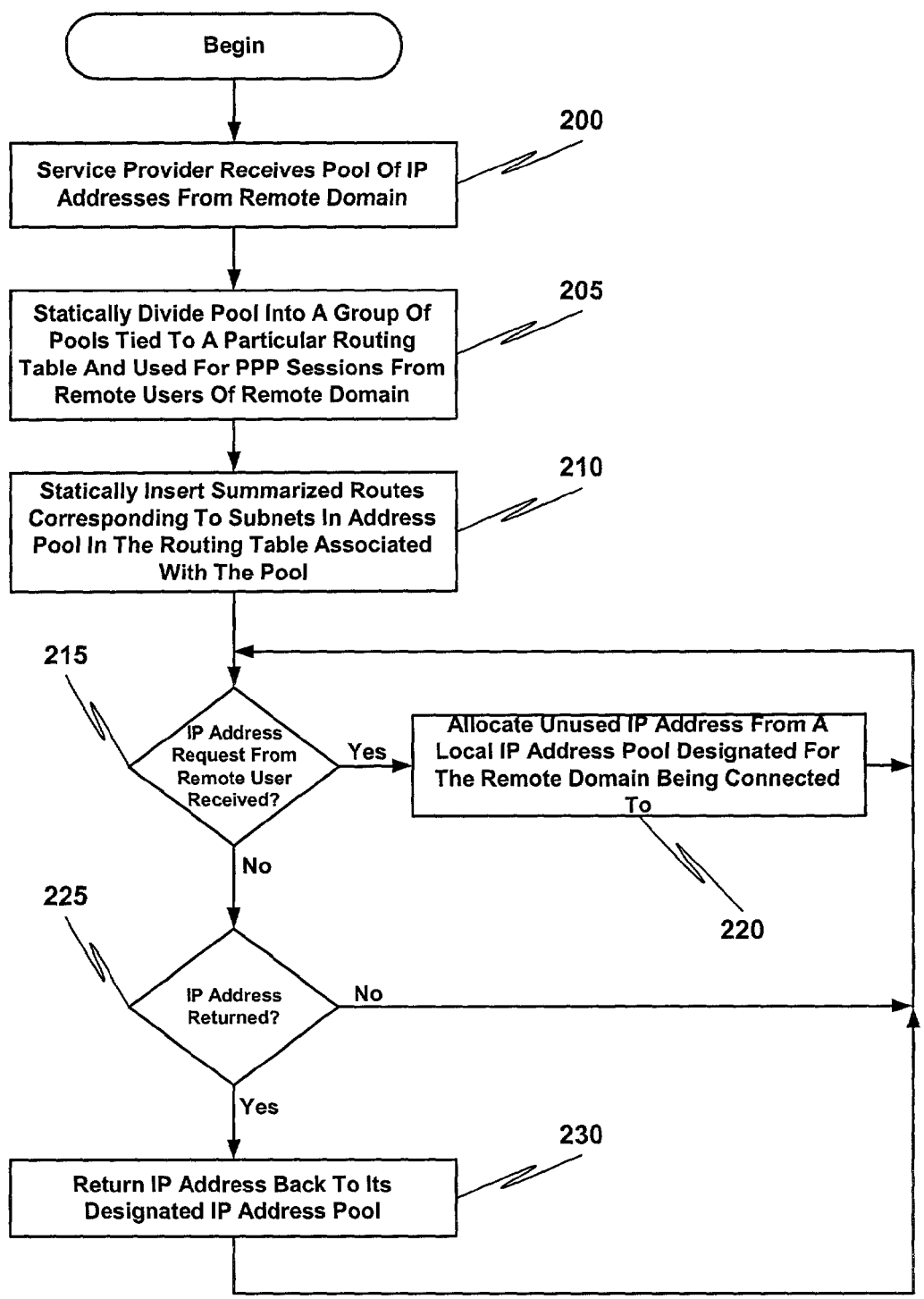
FIG. 2 is a flow diagram that illustrates a method for managing remote domain IP address pools that includes route summarization using statically configured local IP address pools.

Embodiments of the present invention are described herein in the context of a system and method for resource allocation and reclamation for on-demand address pools. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The authentication, authorization and accounting (AAA) service performs user authentication, user authorization and user accounting functions. It may be a Cisco ACS™ product such as Cisco Access Register™ or Cisco Secure™, both available from Cisco Systems, Inc. of San Jose, Calif., or an equivalent product. In accordance with a presently preferred embodiment of the present invention, the Remote Authentication Dial-In User Service (RADIUS) protocol is used as the communication protocol for carrying AAA information. RADIUS is an Internet standard track protocol for carrying authentication, authorization, accounting and configuration information between devices that desire to authenticate their links and a shared AAA or AAA proxy service. Those of ordinary skill in the art will realize that other protocols such as TACACS+ (Tools & Algorithms for Construction and Analysis of Systems) or DIAMETER can be used as acceptable communications links between the various communications devices that encompass the data communication network and still be within the inventive concepts disclosed herein. RADIUS, TACAS+, and DIAMETER are protocols known by those of ordinary skill in the art and thus will not be further discussed other than in the context of the present invention in order to avoid over-complicating the disclosure.

According to embodiments of the present invention, a global IP address pool maintains a pool or block of IP addresses for one or more remote domains. Each pool is divided into subnets and these subnets are assigned to edge routers when requested. An edge router includes at least one local IP address pool configured for at least one remote domain supported by the edge router. IP addresses are allocated using a first-assigned-subnet-first policy, wherein an IP address is allocated from a least recently assigned subnet having at least one unallocated IP address. The edge router makes subnet requests and releases subnets based upon local IP address pool utilization. Dynamic allocation of subnets between local IP address pools allows relatively efficient route summarization as well as relatively efficient utilization of a remote domain's IP address space.

Figure 3:
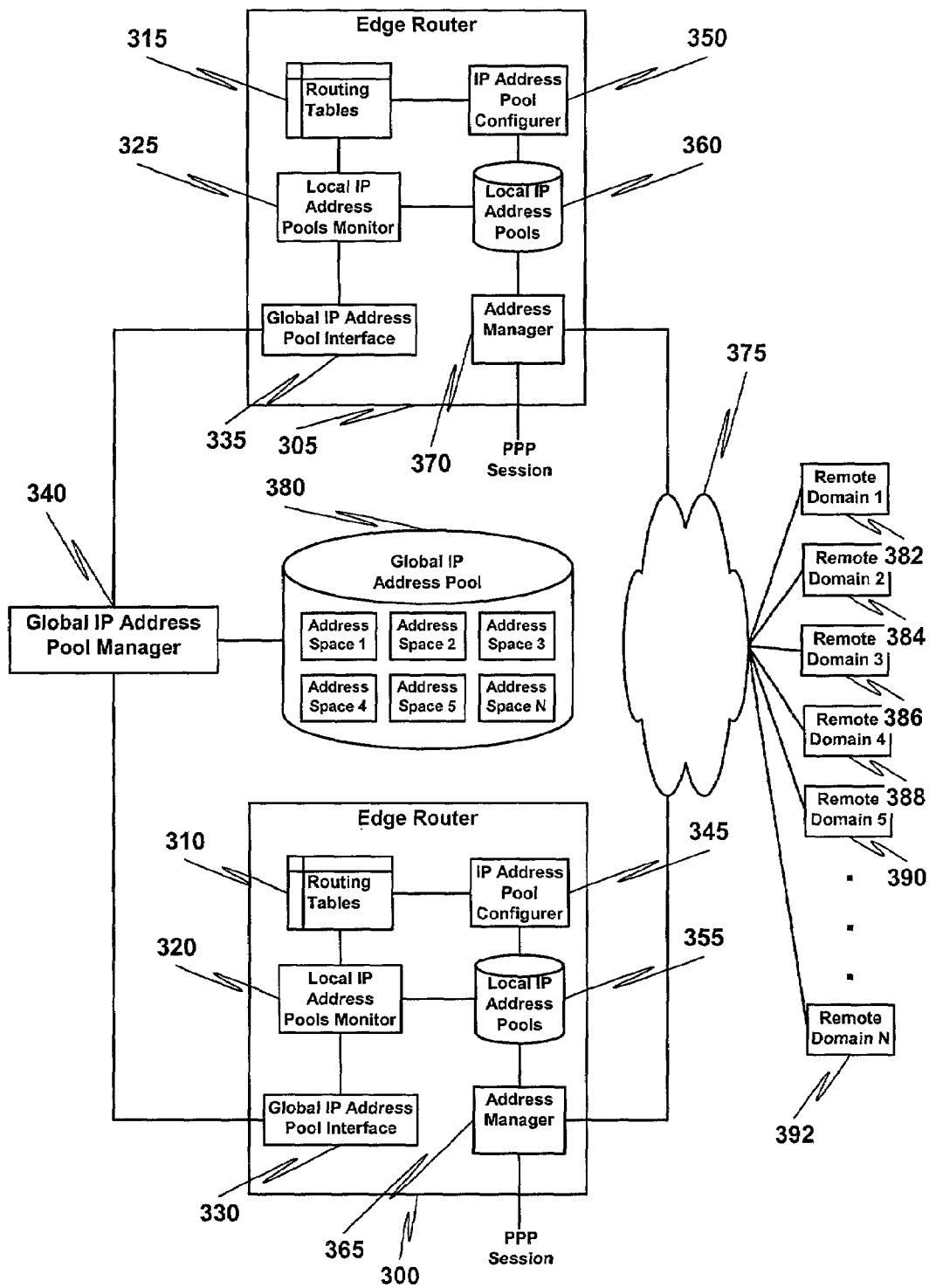
FIG. 3 is a block diagram that illustrates an apparatus for on-demand IP address management in accordance with one embodiment of the present invention.

Turning now to FIG. 3, a block diagram that illustrates an apparatus for on-demand IP address management in accordance with one embodiment of the present invention is presented. FIG. 3 includes edge router 300 and edge router 305. Each edge router (300, 305) includes a routing table storage (310, 315) coupled to a local IP address pools monitor (320, 325) and a global IP address pool interface (330, 335) coupled to the local IP address pools monitor (320, 325) and a global IP address pool manager 340. Each edge router (300, 305) also includes an IP address pool configurer (345, 350) coupled to the routing table storage (310, 315) and to a local IP address pools storage (355, 360). Local IP address pools storage (355, 360) is coupled to the local IP address pools monitor (320, 325) and to a local IP address manager (365, 370). Local IP address manager (365, 370) is coupled to network 375. Global IP address pool manager 340 is coupled to global IP address pool 380, which includes global per-remote domain IP address pool information.

One or more of remote domains 382-392 provide a service provider with a set of IP addresses for the service provider to manage on behalf of the remote domains. The number of remote domains illustrated is not intended to be in any way limiting. The service provider stores information about these IP addresses in global IP address pool 380. The service provider may also configure edge router (300, 305) with one or more subnets for one or more remote domains. In operation, address manager (370, 365) receives a PPP connection request and allocates an IP address from the local IP address pool designated for the remote domain being connected to. The IP address is returned to the local IP address pool when the PPP session ends.

According to one embodiment of the present invention, Local IP address pools monitor (320, 325) monitors local IP address pool utilization. Local IP address pools monitor (320, 325) issues a request for an additional subnet when local IP address pool utilization exceeds a high watermark. Local IP address pools monitor (320, 325) also releases a subnet when local IP address pool utilization drops below a low watermark.

According to another embodiment of the present invention, subnet assignment and deassignment are event-driven. The address manager (370, 365) includes increased functionality in lieu of the local IP address pool monitor (320, 325). Address manager (370, 365) determines whether local IP address pool utilization exceeds a high watermark whenever an IP address is allocated. An additional subnet is requested when local IP address pool utilization exceeds the high watermark. Address manager (370, 365) also determines whether local IP address pool utilization exceeds a low watermark whenever an IP address is deallocated. A subnet is released when local IP address pool utilization drops below a low watermark.

According to embodiments of the present invention, IP addresses are allocated from subnets on a first-assigned-subnet-first basis. In other words, if more than one subnet assigned to the remote domain have an unallocated IP address, an IP address is allocated from the subnet that was least recently assigned to the local address pool. Additionally, subnets are released or deassigned on a last-assigned-subnet-first basis. In other words, if more than one subnet assigned to the remote domain have no allocated IP addresses and if the determination to release a subnet has been made, the subnet that was most recently assigned to the local address pool is released.

Figure 4:
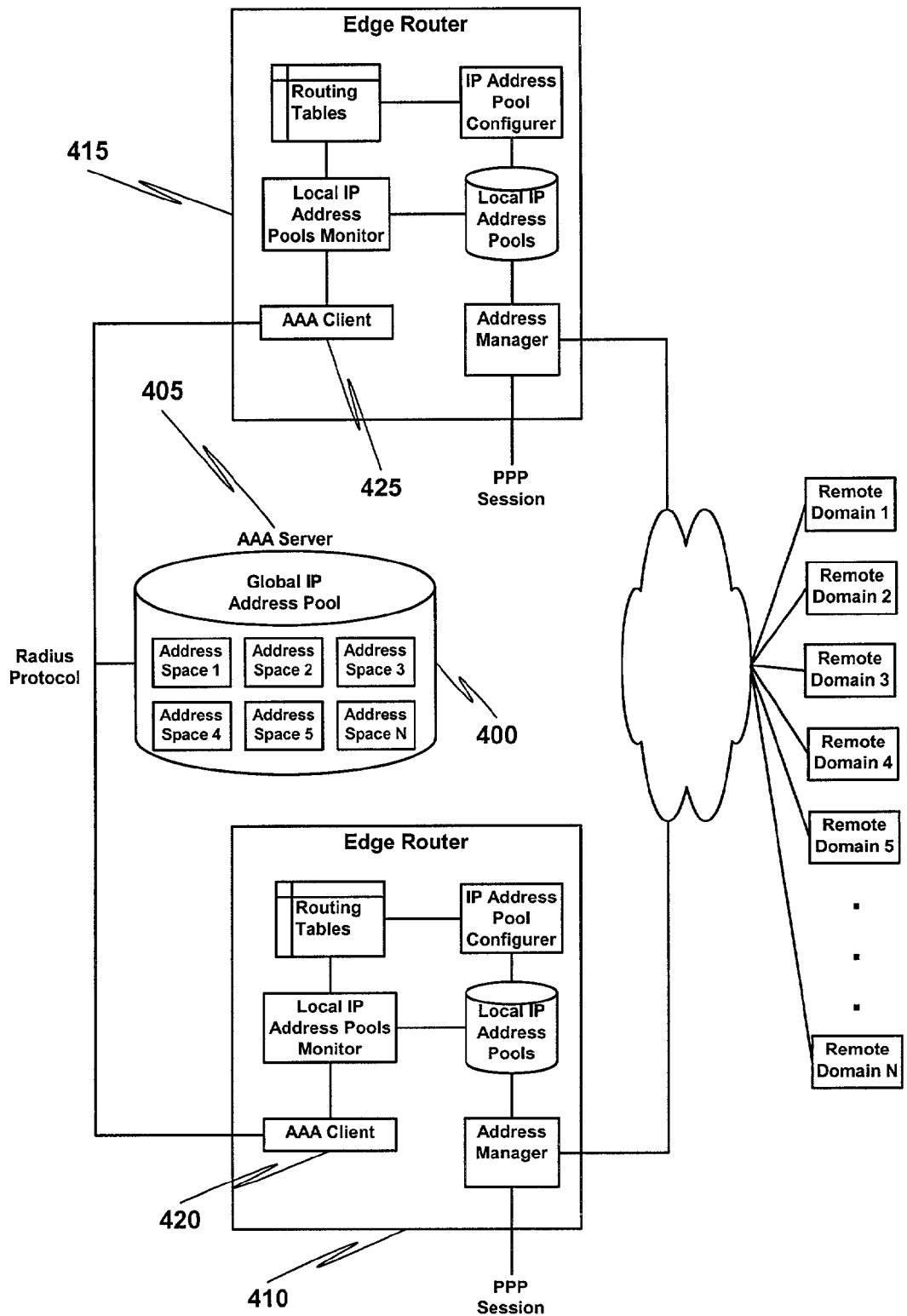
FIG. 4 is a block diagram that illustrates an apparatus for on-demand IP address management using the RADIUS protocol in accordance with one embodiment of the present invention.
Figure 5:
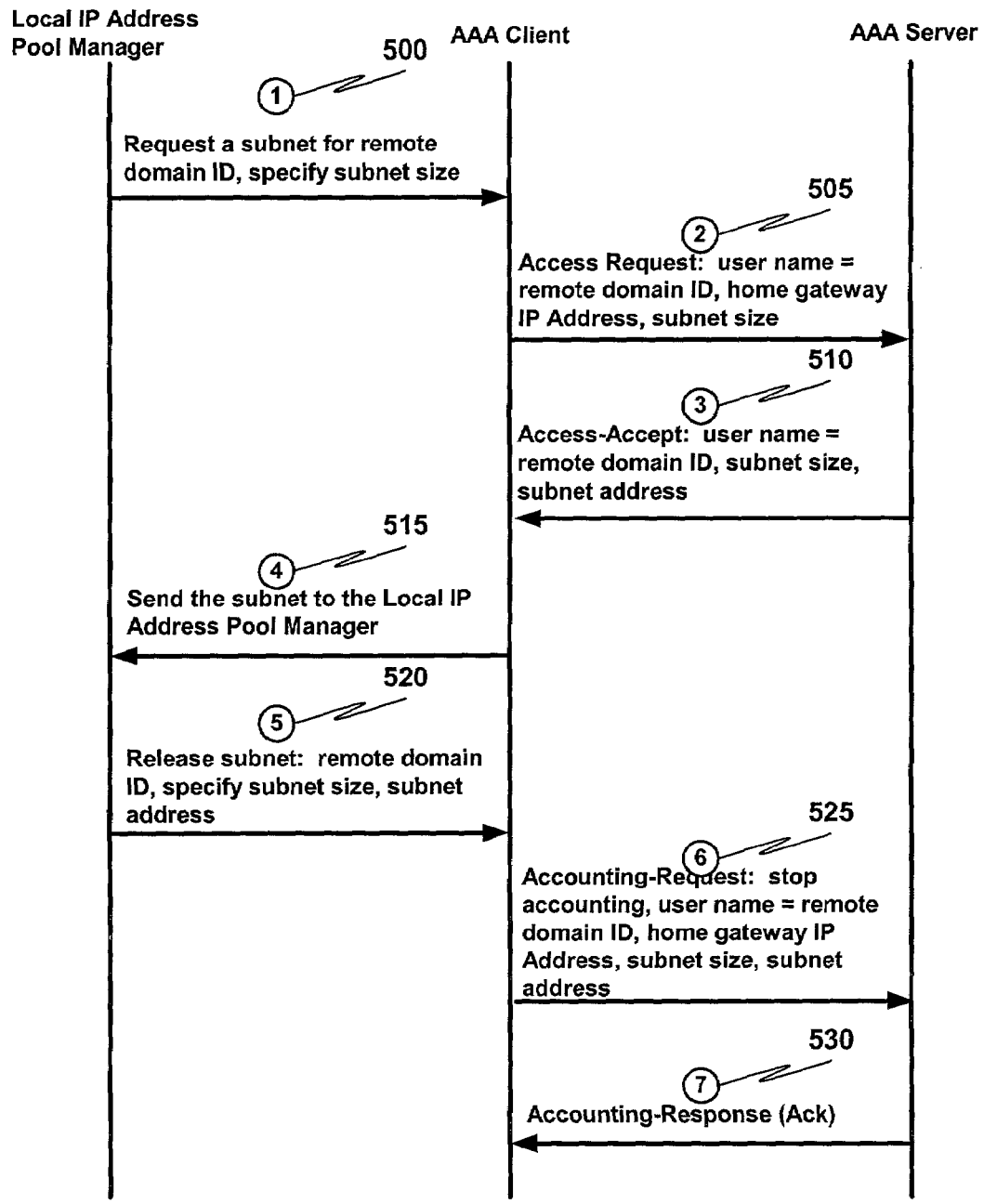
FIG. 5 is a ladder diagram that illustrates on-demand IP address management in accordance with one embodiment of the present invention.
Figure 6:
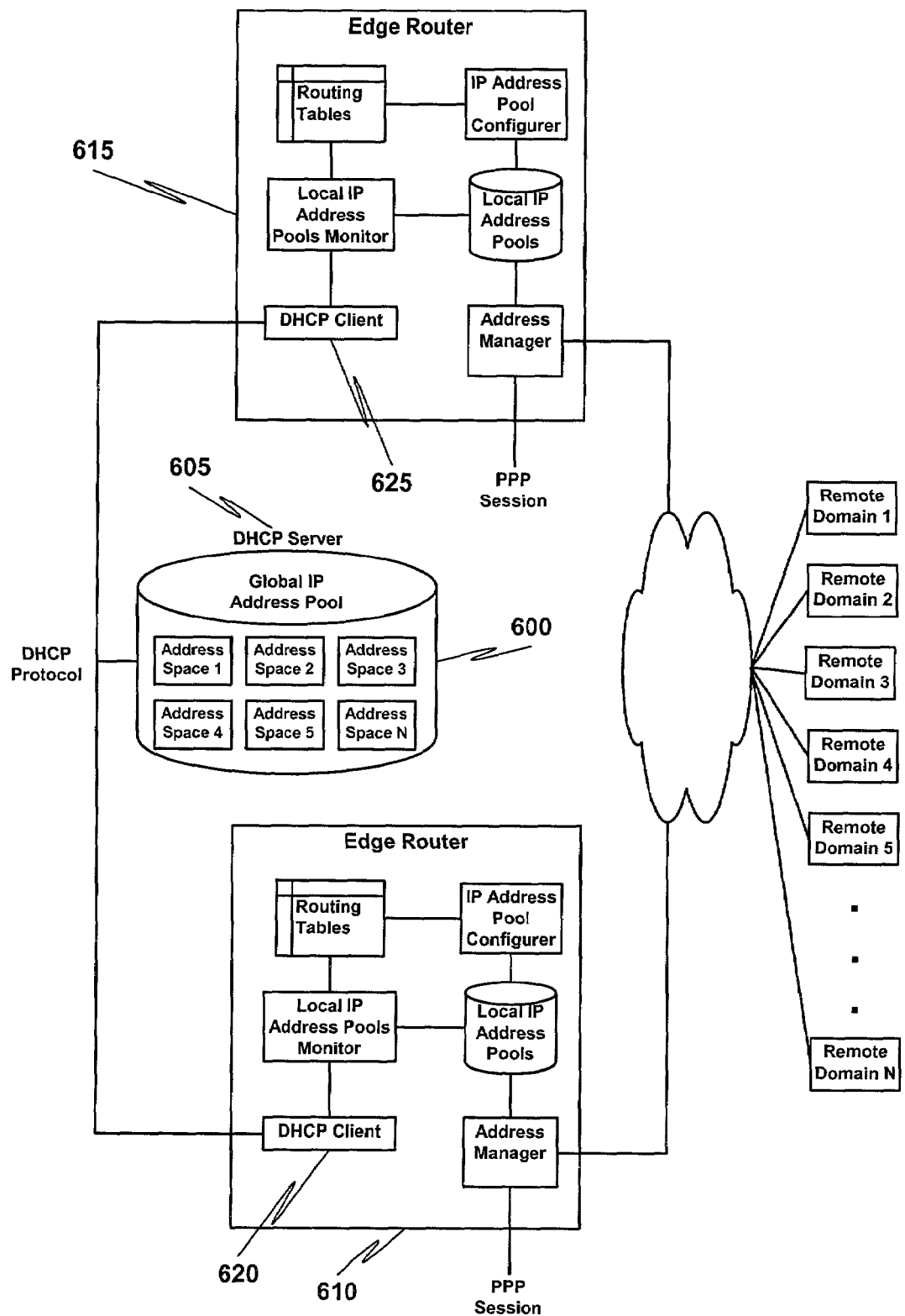
FIG. 6 is a block diagram that illustrates an apparatus for on-demand IP address management using the DHCP protocol in accordance with one embodiment of the present invention.
Figure 7:
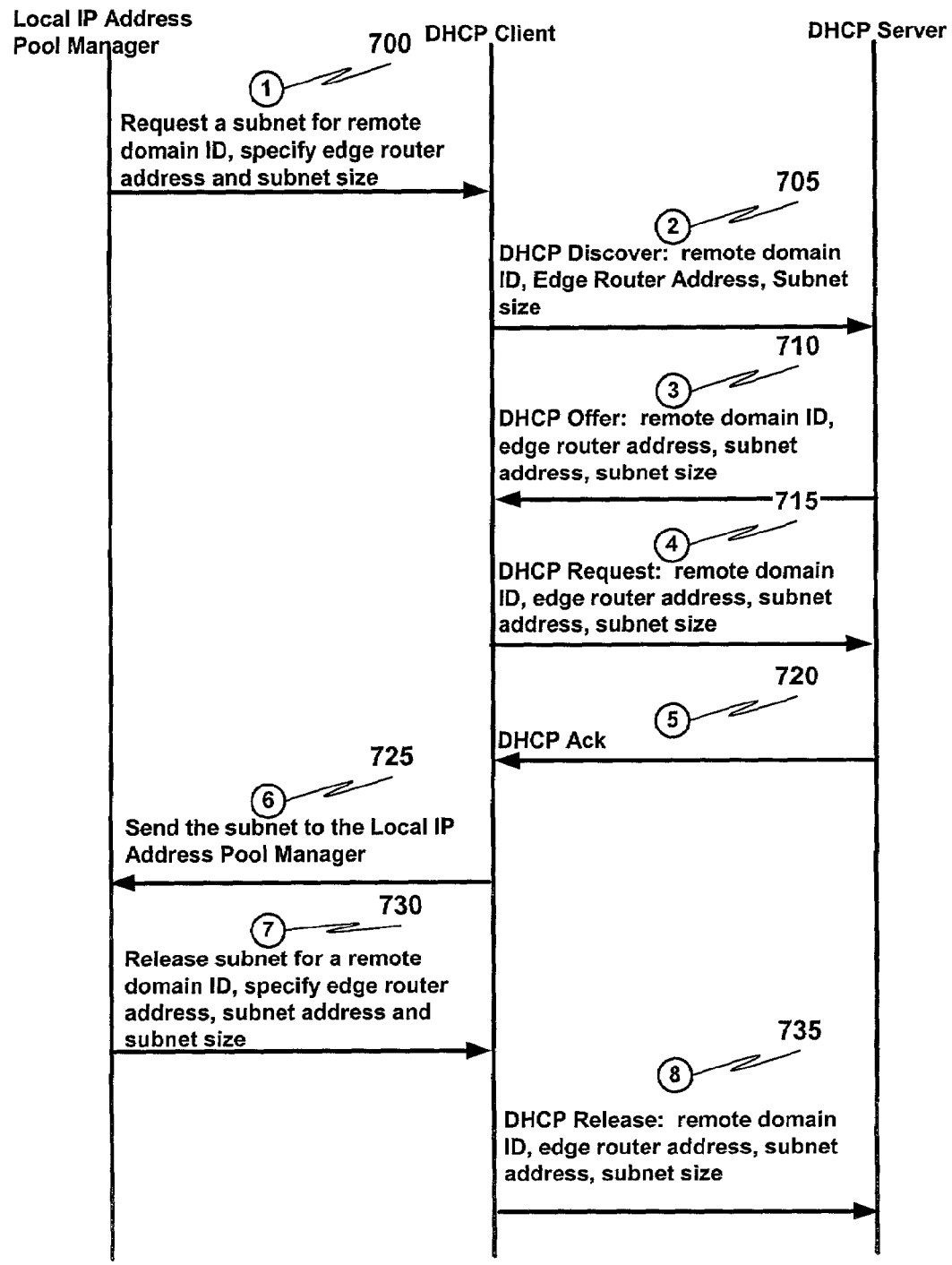
FIG. 7 is a ladder diagram that illustrates on-demand IP address management in accordance with one embodiment of the present invention.

FIGS. 4 and 5 illustrate on-demand IP address management using the RADIUS protocol. FIGS. 6 and 7 illustrate on-demand IP address management using the DHCP protocol. Those of ordinary skill in the art will realize that other address management protocols can be used as acceptable communications links between the various communications devices that encompass the data communication network and still be within the inventive concepts disclosed herein.

Turning now to FIG. 4, a block diagram that illustrates an apparatus for on-demand IP address management using the RADIUS protocol in accordance with one embodiment of the present invention is presented. A Global IP address pool 400 is maintained in AAA server 405. Edge routers 410 and 415 communicate with the AAA server 405 via AAA clients 420 and 425.

Turning now to FIG. 5, a ladder diagram that illustrates on-demand IP address management in accordance with one embodiment of the present invention is presented. The process used to obtain an additional subnet is illustrated beginning with reference numeral 500. At 500, the local IP address pool manager issues a subnet request. The request includes a remote domain ID and a requested subnet size. The remote domain ID is an identifier for the address space to which the user belongs. According to one embodiment of the present invention, the remote domain ID is the domain name. Those of ordinary skill in the art will recognize that other identification methods may be used. At 505, the AAA client receives the request, puts the request in RADIUS format and sends the request to the AAA server. At 510, the AAA server responds with a subnet assignment packet that includes the remote domain ID, assigned subnet size and assigned subnet address. At 515, the AAA client receives the subnet assignment packet, extracts the assigned subnet and sends it to the local IP address pool manager.

Still referring to FIG. 5, the process used to release a subnet is illustrated beginning with reference numeral 520. At 520, a packet including the remote domain ID, subnet size and subnet address are sent to the AAA client. At 525, the AAA client receives the packet, puts the packet in RADIUS format and sends the subnet release packet to the AAA server. At 530, the AAA server issues an acknowledge packet.

Turning now to FIG. 6, a block diagram that illustrates an apparatus for on-demand IP address management using the DHCP protocol in accordance with one embodiment of the present invention is presented. The global IP address pool 600 is maintained in DHCP server 605. Edge routers 610 and 615 communicate with DHCP server 605 via DHCP clients 620 and 625.

Turning now to FIG. 7, a ladder diagram that illustrates on-demand IP address management in accordance with one embodiment of the present invention is presented. The process used to obtain a subnet is illustrated beginning with reference numeral 700. At 700, the local IP address pool manager issues a subnet request. The request includes a remote domain ID, edge router address and requested subnet size. At 705, the DHCP client receives the request, puts the request in DHCP format and sends a DHCP Discover packet to the DHCP server. Upon receipt of the DHCP discover packet, the DHCP server uses the remote domain ID, edge router address and requested subnet size in the DHCP discover packet to obtain a subnet from the global IP address pool. At 710, the DHCP server responds with a DHCP Offer packet that includes the offered remote domain ID, edge router address, subnet address and subnet size. At 715, the DHCP client sends a DHCP request packet that includes the offered remote domain ID, edge router address, subnet address and subnet size. At 720, the DHCP client receives an acknowledge packet from the DHCP server. At 725, the DHCP client extracts the assigned subnet and sends it to the local IP address pool manager.

Still referring to FIG. 7, the process used to release a subnet is illustrated beginning with reference numeral 730. At 730, a packet including the remote domain ID, edge router address, subnet address and subnet size is sent to the DHCP client. At 735, the DHCP client receives the packet, puts the packet in DHCP format and sends the DHCP release packet to the DHCP server. Processing continues without waiting for an acknowledgement packet.

Figure 8:
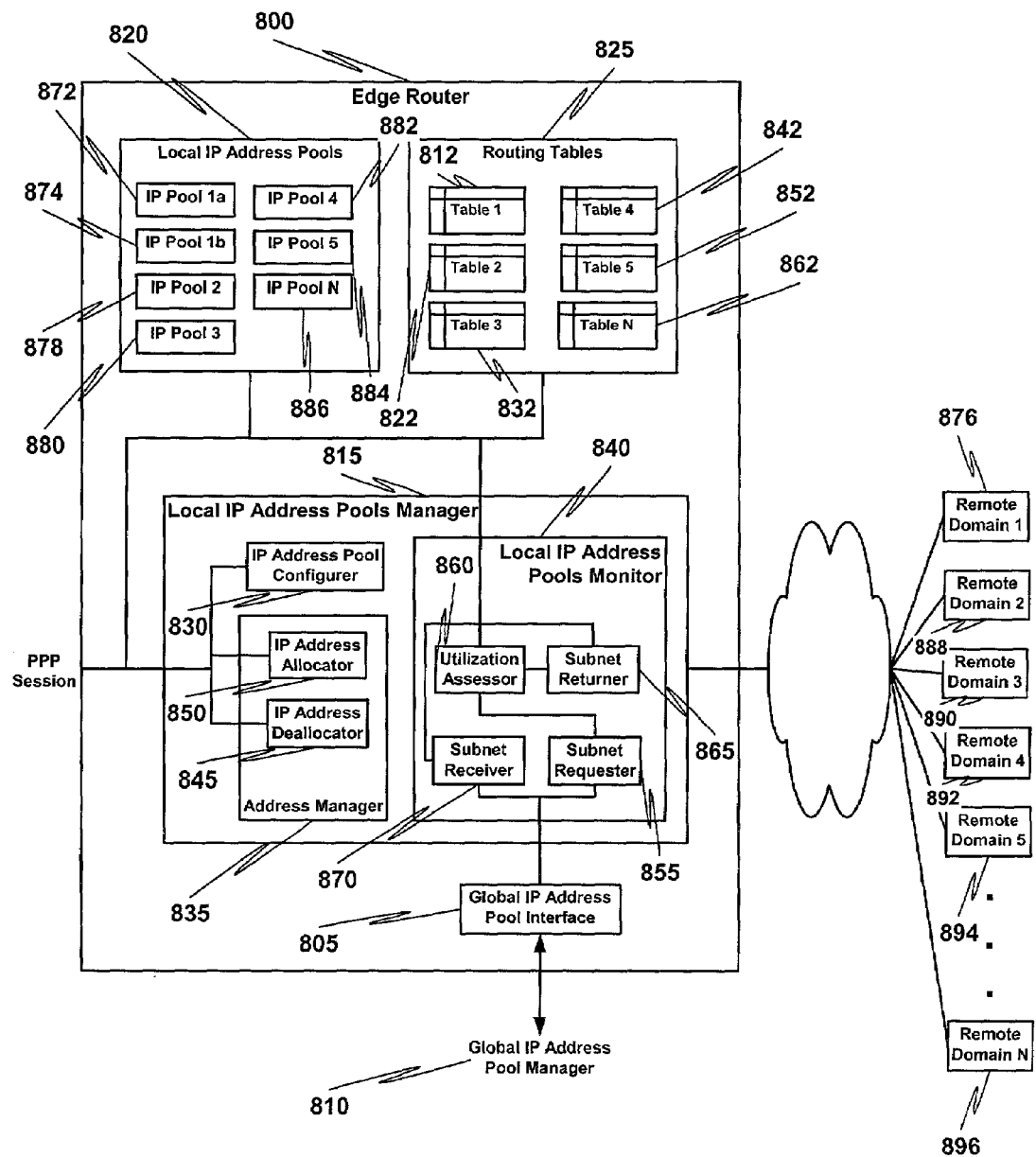
FIG. 8 is a block diagram that illustrates an edge router configured for on-demand IP address management in accordance with one embodiment of the present invention.
Figure 9:
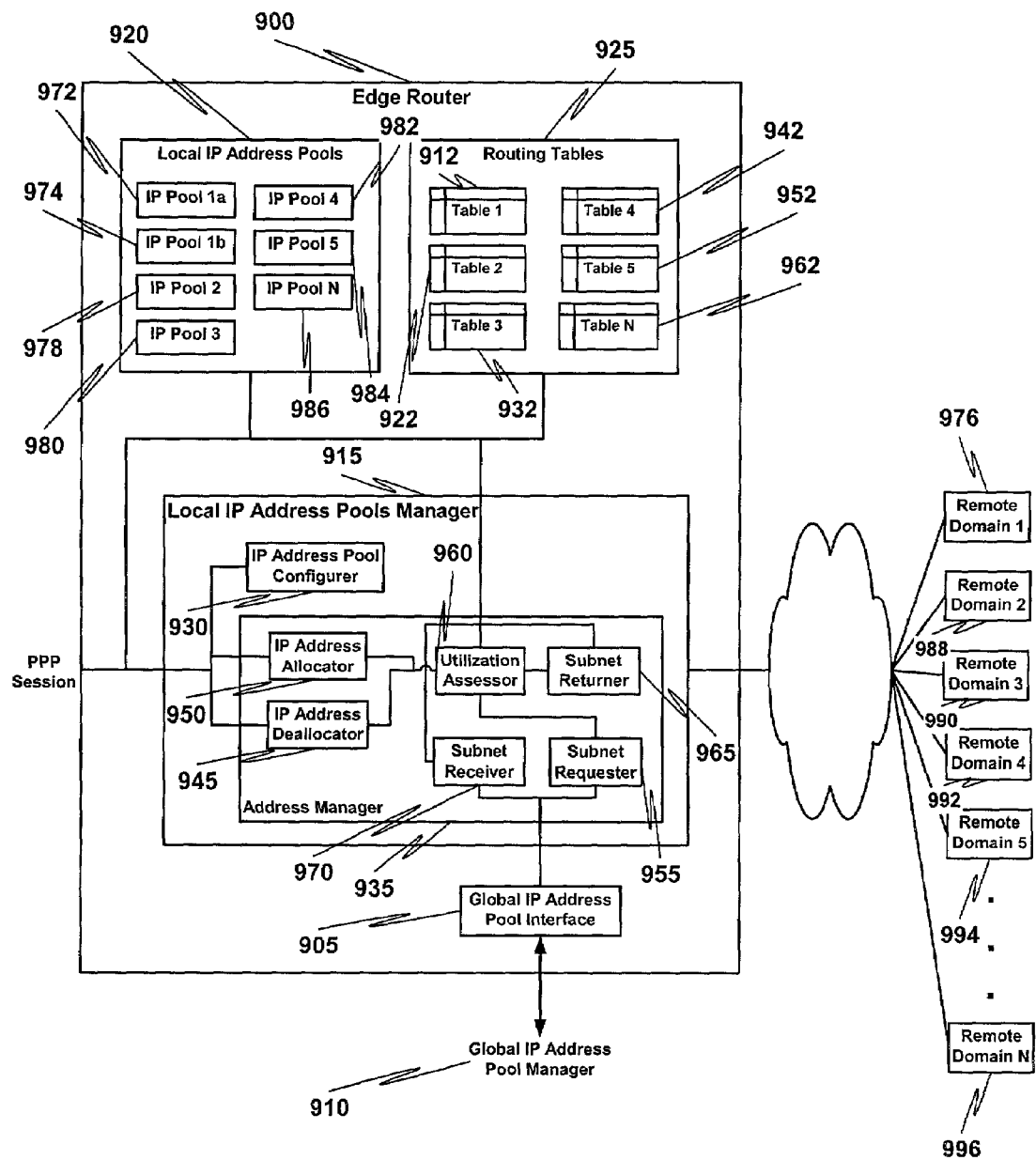
FIG. 9 is a block diagram that illustrates an edge router configured for on-demand IP address management in accordance with one embodiment of the present invention.

FIGS. 8 and 9 are block diagrams that illustrate an edge router configured for on-demand IP address management in accordance with embodiments of the present invention. FIGS. 8 and 9 provide more detail for reference numerals 300 and 305 of FIG. 3, reference numerals 410 and 415 of FIG. 4, and reference numerals 610 and 615 of FIG. 6. In FIG. 8, a local IP address pools monitor periodically determines local IP address pool utilization and requests subnet assignment or releases subnets accordingly. In FIG. 9, subnet assignment and deassignment is event-driven. An IP address allocation event triggers subnet assignment by an address manager. An IP address deallocation event triggers subnet deassignment by the address manager.

Referring to FIG. 8, edge router 800 includes a global IP address pool interface 805 coupled to a global IP address pool manager 810 and a local IP address pools manager 815. The local IP pools manager 815 is coupled to a local IP address pool storage 820 and a routing table storage 825. Local IP address pools manager 815 includes an IP address pool configurer 830, an address manager 835 and a local IP address pools monitor 840. The address manager 835 includes an IP address allocator 850 and an IP address deallocator 845. The local IP address pools monitor 840 includes a subnet requester 855 coupled to the global IP address pool interface 805 and to a utilization assessor 860. The utilization assessor 860 is coupled to a subnet returner 865 and the local IP address pools storage 820. The local IP address pools monitor 840 also includes a subnet receiver 870 coupled to the global IP address pool interface 805, the local IP address pools storage 820 and the routing table storage 825.

Local IP address pools storage 820 includes at least one local IP address pool that is designated for a particular remote domain. As shown in FIG. 8, local IP address pool 1a (872) and 1B (874) are designated for remote domain 1 (876), while local IP address pools 2 (878), 3 (880), 4 (882), 5 (884) and N (886) are designated for remote domains 888, 890, 892, 894 and 896, respectively. Similarly, routing table storage 825 includes a routing table that is designated for a particular remote domain. As shown in FIG. 8, routing tables 812, 822, 842, 852 and 862 are designated for remote domains 876, 888, 890, 892, 894 and 896, respectively.

In operation, IP address pool configurer 830 configures at least one local IP address pool and associated routing table. IP address allocator 850 receives a PPP session request. IP address allocator 850 uses a first-assigned-subnet-first policy to allocate an IP address from the local IP address pool designated for the remote domain being connected to. IP address deallocator 845 releases the IP address when the PPP session ends.

Still referring to FIG. 8, local IP address monitor 840 monitors local IP address pool utilization and attempts to modify the size or number of subnets allocated to a local IP address pool based upon IP address utilization. In more detail, utilization assessor 860 periodically assesses local IP address pool utilization. If IP address pool utilization exceeds a high watermark, utilization assessor interfaces with subnet requestor 855 to request an additional subnet for the overutilized IP address pool. Subnet receiver 870 receives a requested subnet and updates the corresponding local IP address pool and routing table. If IP address pool utilization falls below a low watermark, utilization assessor 860 interfaces with subnet returner 865 to return a subnet, making it available for use by another edge router having an IP address pool associated with the same remote domain.

Referring to FIG. 9, edge router 900 includes a global IP address pool interface 905 coupled to a global IP address pool manager 910 and a local IP address pools manager 915. The local IP pools manager 915 is coupled to a local IP address pool storage 920 and a routing table storage 925. Local IP address pools manager 915 includes an IP address pool configurer 930 and an address manager 935. The address manager 935 includes an IP address allocator 950 and an IP address deallocator 945. The address manager 935 also includes a subnet requester 955 coupled to the global IP address pool interface 905 and to a utilization assessor 960. The utilization assessor 960 is coupled to a subnet returner 965 and the local IP address pools storage 920. The address manager 935 also includes a subnet receiver 970 coupled to the global IP address pool interface 905, the local IP address pools storage 920 and the routing table storage 925.

In operation, IP address pool configurer 930 configures at least one local IP address pool and associated routing table. IP address allocator 950 receives a PPP session request. IP address allocator 950 uses a first-assigned-subnet-first policy to allocate an IP address from the local IP address pool designated for the remote domain being connected to. IP address deallocator 945 releases the IP address when the PPP session ends.

Still referring to FIG. 9, IP address allocator 950 interfaces with utilization assessor 960 when an IP address is allocated to determine whether a subnet should be requested. If IP address pool utilization exceeds a high watermark, utilization assessor 960 interfaces with subnet requestor 955 to request an additional subnet for the overutilized IP address pool. Subnet receiver 970 receives a requested subnet and updates the corresponding local IP address pool and routing table. IP address deallocator 945 interfaces with utilization assessor 960 when an IP address is deallocated to determine whether a subnet should be returned. If IP address pool utilization falls below a low watermark, utilization assessor 960 interfaces with subnet returner 965 to return a subnet, making it available for use by another edge router having an IP address pool associated with the same remote domain.

Figure 10A:
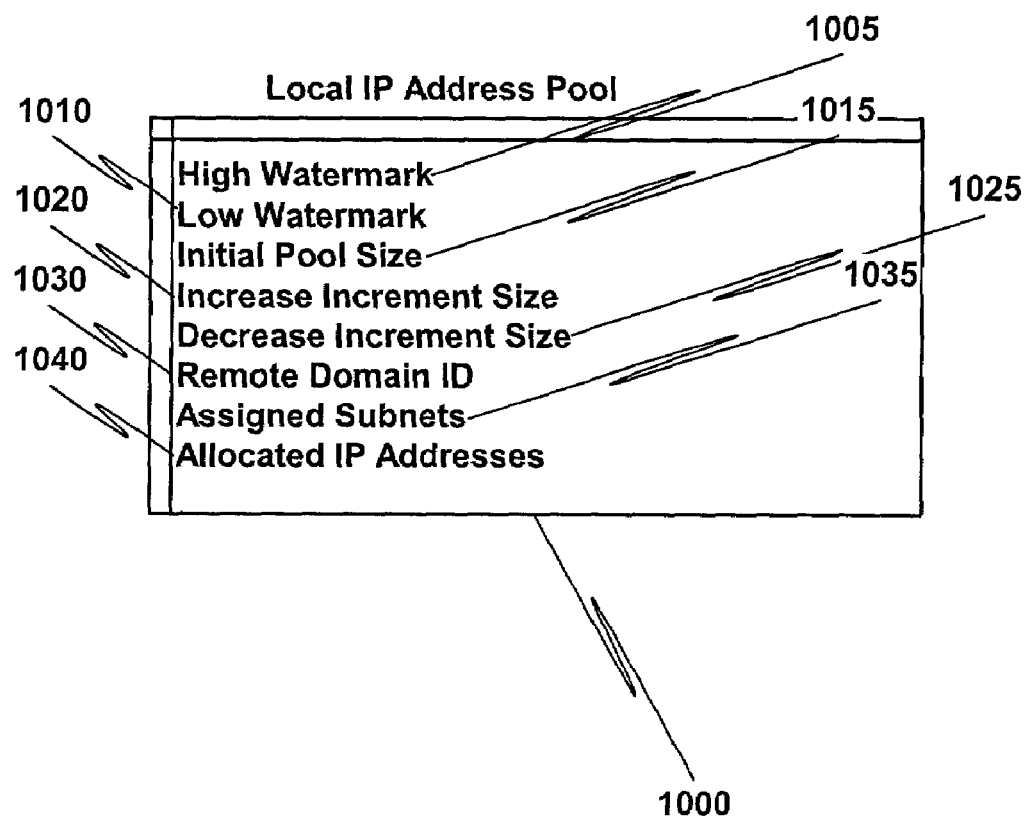
FIG. 10A is a block diagram that illustrates the contents of a local IP address pool in accordance with one embodiment of the present invention.

Turning now to FIG. 10A, a block diagram that illustrates the contents of a local IP address pool in accordance with one embodiment of the present invention is presented. The local IP address pool 1000 includes the initial pool size 1015, a high watermark 1005 and a low watermark 1010. The high watermark 1005 indicates an upper limit on the number of IP addresses in use before another subnet is requested. The low watermark 1010 indicates a lower limit on the number of IP addresses in use before a subnet is released.

The local IP address pool 1000 also includes an increase increment size 1020 and a decrease increment size 1025. The increase increment size 1020 indicates the number of IP addresses to request when IP address utilization exceeds the high watermark 1005. The decrease increment size 1025 indicates the number of addresses to release when the IP address utilization falls below the low watermark 1010.

The local IP address pool 1000 also includes the assigned subnets 1035, an indication of which IP addresses are allocated 1040 and the remote domain ID 1030 associated with the subnets in the local IP address pool.

Figure 10B:
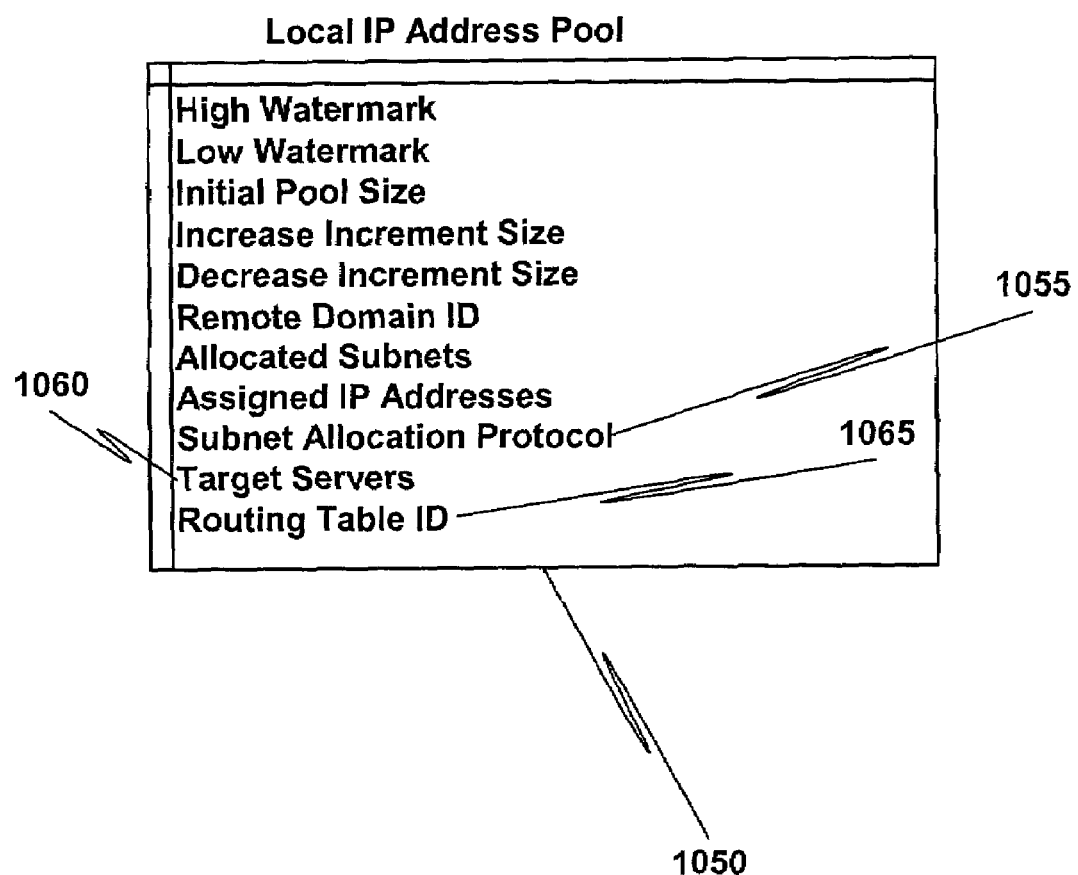
FIG. 10B is a block diagram that illustrates the contents of a local IP address pool in accordance with one embodiment of the present invention.

Turning now to FIG. 10B, a block diagram that illustrates the contents of a local IP address pool in accordance with one embodiment of the present invention is presented. The local IP address pool 1050 illustrated in FIG. 10B includes the fields indicated in FIG. 10A. Additional fields include the subnet assignment protocol 1055, target servers 1060 and routing table ID 1065. The subnet assignment protocol 1055 may be, by way of example, RADIUS or DHCP. The target servers field 1060 indicates at least one server that includes the global IP address pool. The routing table ID 1065 identifies the routing table designated for the local IP address pool.

Figure 11:
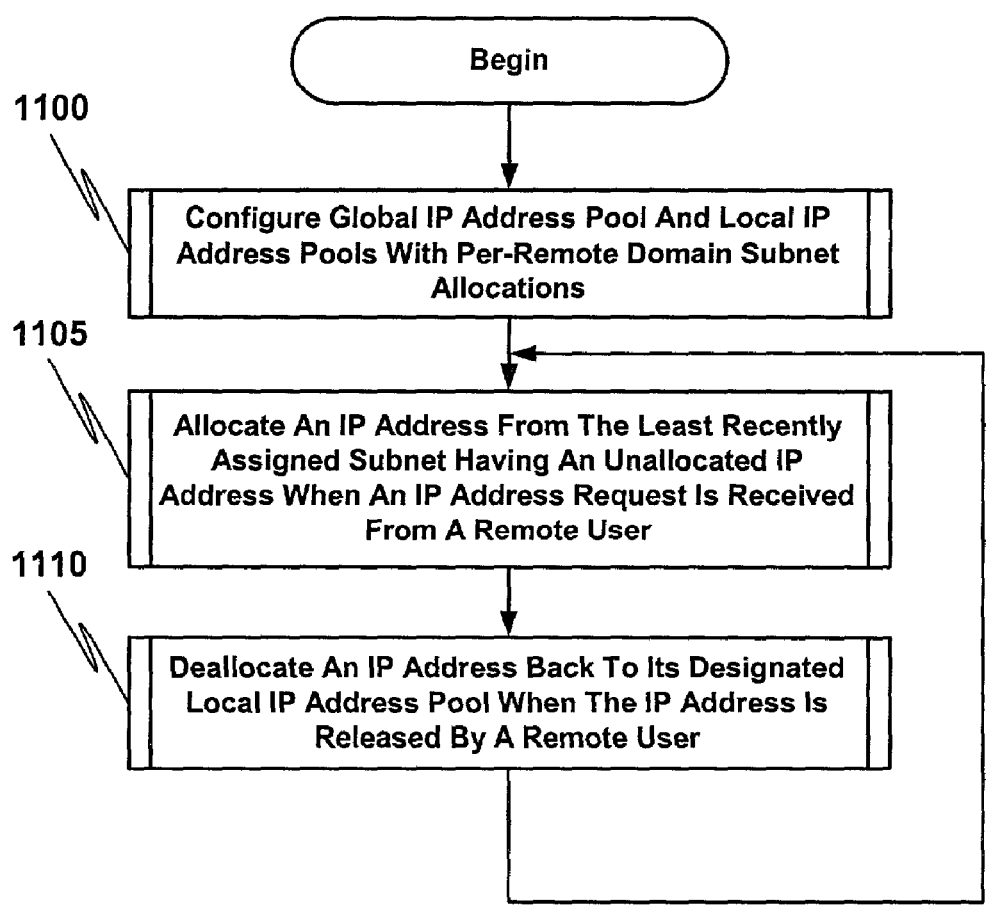
FIG. 11 is a flow diagram that illustrates a method for on-demand IP address management in accordance with one embodiment of the present invention.

Turning now to FIG. 11, a flow diagram that illustrates a method for on-demand IP address management in accordance with one embodiment of the present invention is presented. At 1100, a global IP address pool and at least one local IP address pool are configured with per-remote domain subnet assignments. At 1105, an unused IP address is allocated from a local IP address pool designated for a particular remote domain when an IP address request is received from a remote user. The IP address is allocated from the least recently assigned subnet having an unallocated IP address. According to one embodiment of the present invention, this IP address allocation event triggers a check of the high watermark. If the high watermark is exceeded, an additional subnet is requested. At 1115, an IP address is deallocated back to its designated local IP address pool when a remote user releases the IP address. According to one embodiment of the present invention, this IP address deallocation event triggers a check of the low watermark. If the low watermark is exceeded, a subnet is released. This process of on-demand IP pool management continues at reference numeral 1105.

Figure 12:
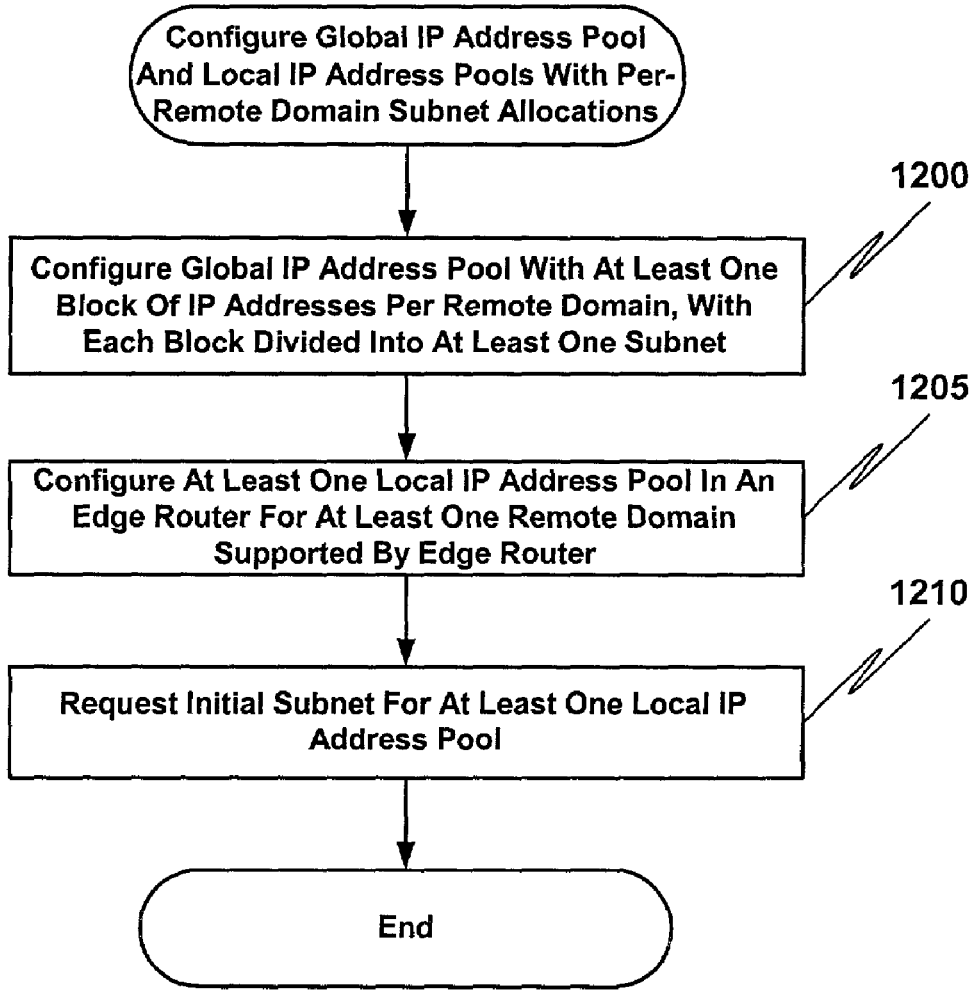
FIG. 12 is a flow diagram that illustrates a method for configuring a global IP address pool and local IP address pools with per-remote domain subnet assignments in accordance with one embodiment of the present invention.

Turning now to FIG. 12, a flow diagram that illustrates a method for configuring a global IP address pool and local IP address pools with per-remote domain subnet assignments in accordance with one embodiment of the present invention is presented. FIG. 12 provides more detail for reference numeral 1100 of FIG. 11. At 1200 the global IP address pool is configured with at least one block of IP addresses per remote domain. Each block includes at least one subnet. At 1205 at least one local IP address pool in an edge router is configured for at least one remote domain supported by the edge router. At 1210 an initial subnet is requested for at least one local IP address pool.

Figure 13:
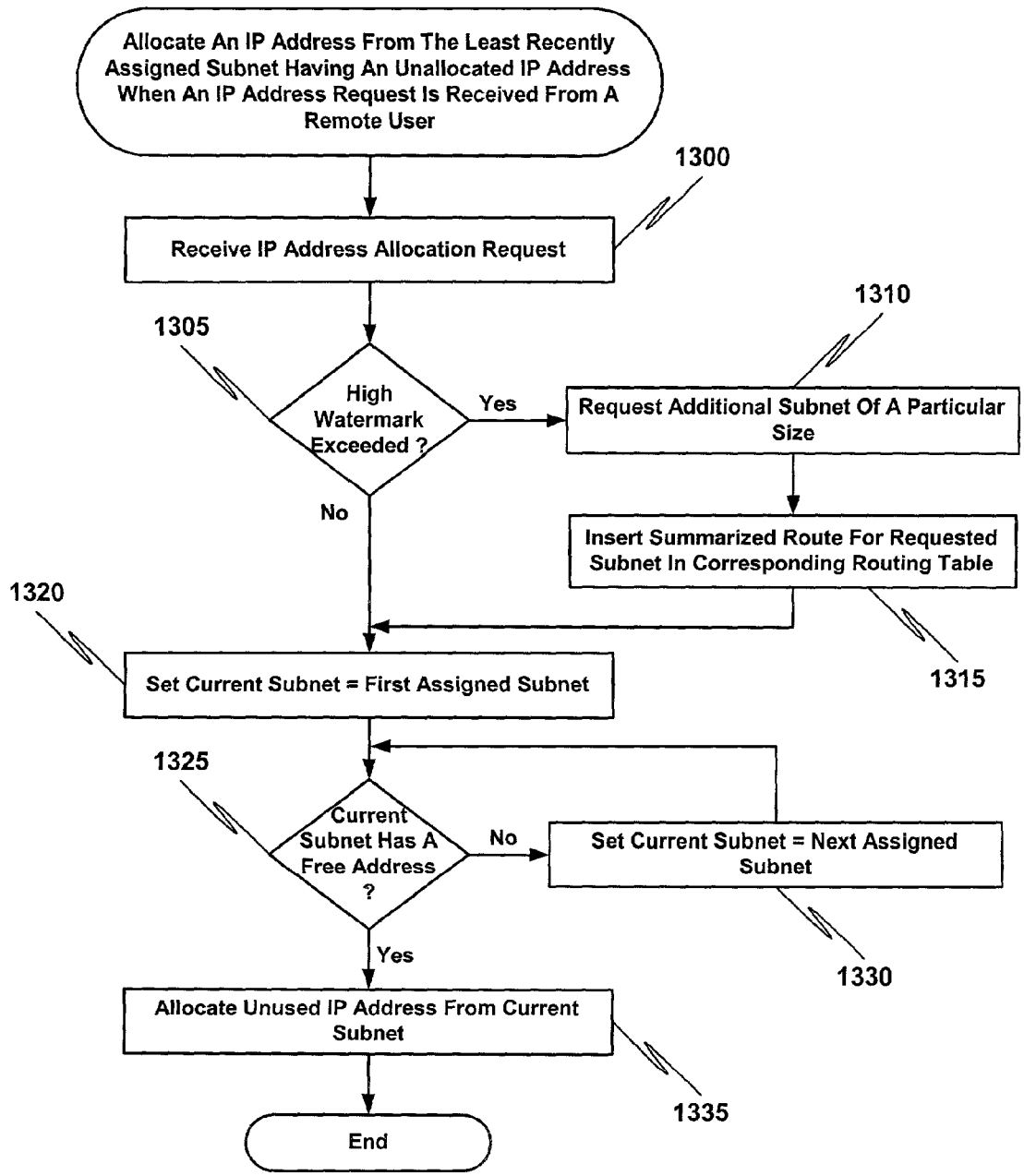
FIG. 13 is a flow diagram that illustrates a method for allocating an IP address from the least recently assigned subnet having an unallocated IP address when an IP address request is received from a remote user in accordance with one embodiment of the present invention.

Turning now to FIG. 13, a flow diagram that illustrates a method for allocating an IP address from the least recently assigned subnet having an unallocated IP address when an IP address request is received from a remote user in accordance with one embodiment of the present invention is presented. FIG. 13 provides more detail for reference numeral 1105 of FIG. 11. At 1300 an IP address allocation request is received. At 1305, a determination is made regarding whether the high watermark has been exceeded. If the high watermark has been exceeded, at 1310 an additional subnet of a particular size is requested. At 1315, a summarized route for the requested subnet is inserted into the corresponding routing table. Regardless of whether the high watermark is exceeded, at 1320 the current subnet is set to the first assigned subnet. At 1325 a determination is made regarding whether the current subnet has an unused address. If all the IP addresses for the current subnet are allocated, the next assigned subnet is selected at 1330 and then examined at 1325. The process represented by reference numerals 1325 and 1330 continues until a subnet having an unused IP address is found. At 1335, an unused IP address is allocated from the subnet.

According to one embodiment of the present invention, the size of a requested subnet is based upon the initial local IP address pool size. According to another embodiment of the present invention, the size of the requested subnet is based upon the current local IP address pool size. According to another embodiment of the present invention, the size of a requested subnet is predetermined. The size of a released subnet may also be predetermined relative to the initial local IP address pool size, or relative to the current local IP address pool size.

Figure 14:
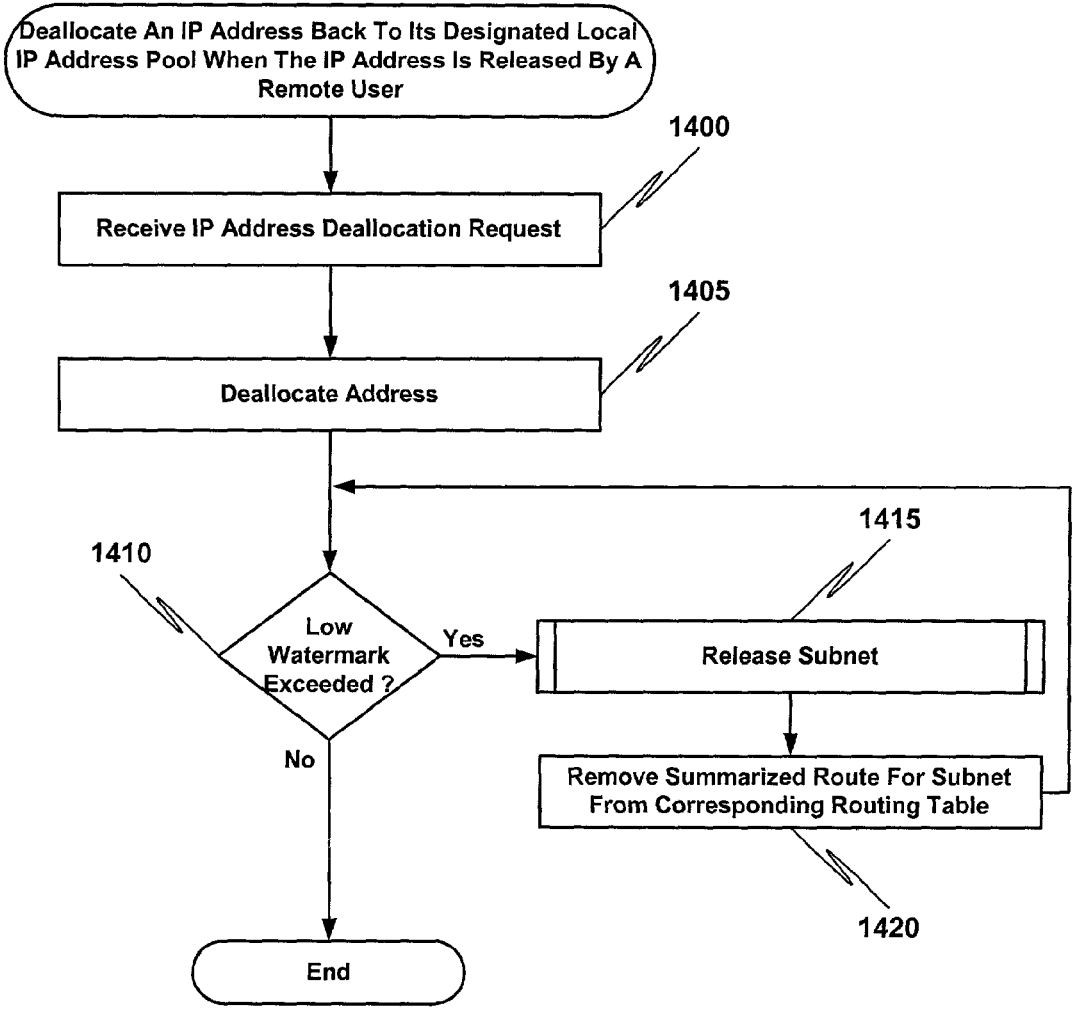
FIG. 14 is a flow diagram that illustrates a method for deallocating an IP address back to its designated local IP address pool when the IP address is released by a remote user in accordance with one embodiment of the present invention.

Turning now to FIG. 14, a flow diagram that illustrates a method for deallocating an IP address back to its designated local IP address pool when the IP address is released by a remote user in accordance with one embodiment of the present invention is presented. FIG. 14 provides more detail for reference numeral 1110 of FIG. 11. At 1400, an IP address deallocation request is received. At 1405, the IP address is deallocated. At 1410, a determination is made regarding whether the low watermark has been exceeded. If the low watermark has been exceeded, a subnet is released at 1415 and the summarized route for the released subnet is removed from the corresponding routing table at 1420. After the released subnet is removed, the low watermark is examined again at 1410. This process of releasing one or more subnets and removing the corresponding summarized route from the routing table continues until the low watermark is not exceeded.

Figure 15:
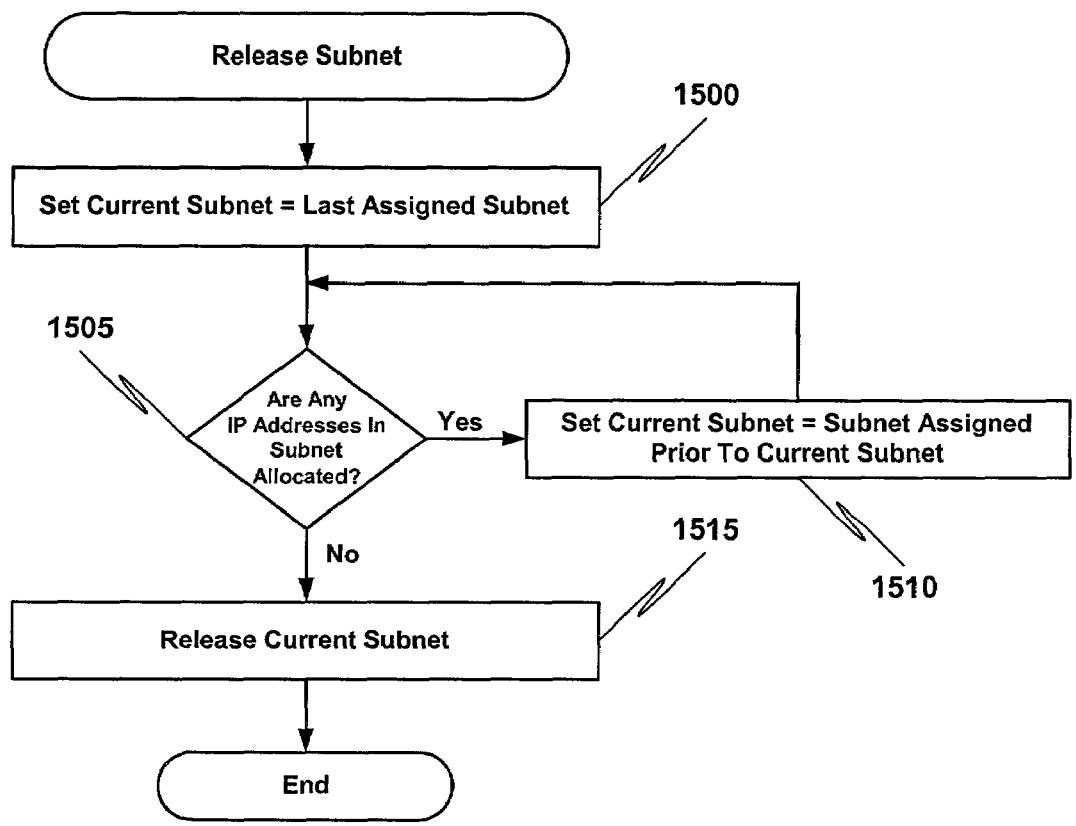
FIG. 15 is a flow diagram that illustrates a method for releasing the most recently assigned subnet having no allocated IP addresses in accordance with one embodiment of the present invention.
Figure 16:
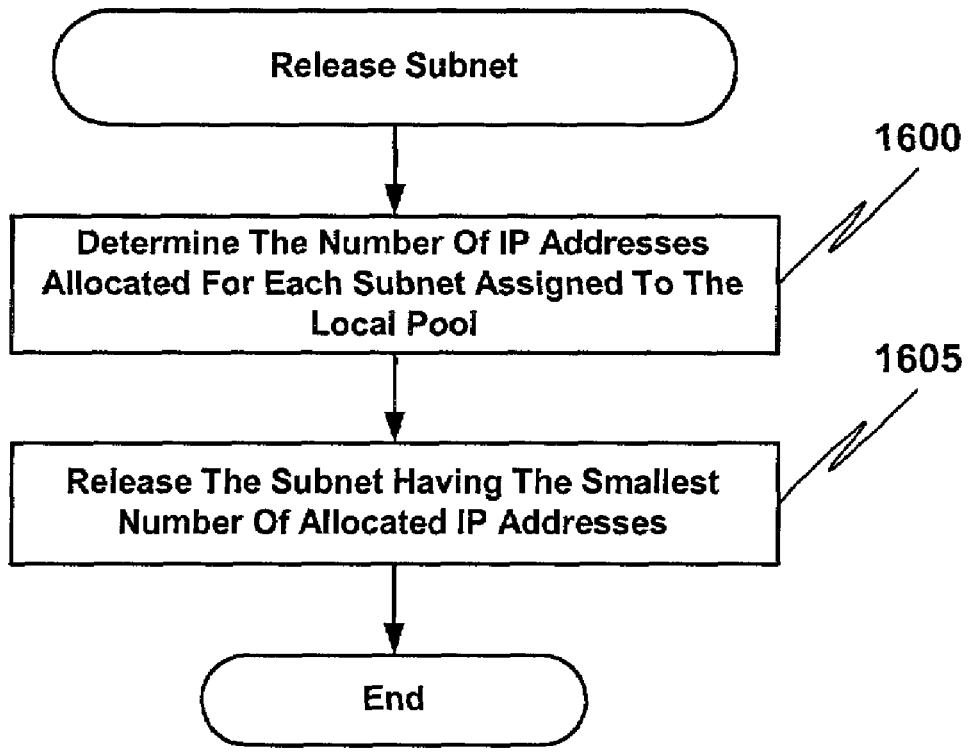
FIG. 16 is a flow diagram that illustrates a method for releasing a subnet having the smallest number of allocated addresses in accordance with one embodiment of the present invention.

FIGS. 15 and 16 are flow diagrams that illustrate releasing or deassigning a subnet in accordance with embodiments of the present invention. Both FIGS. 15 and 16 provide more detail for reference numeral 1415 of FIG. 14. The method illustrated by FIG. 15 releases the most recently assigned subnet that has no allocated IP addresses. The method illustrated by FIG. 16 releases the subnet having the least number of allocated IP addresses. According to one embodiment of the present invention, the subnet release method is configurable.

Referring to FIG. 15, at 1500 the current subnet is set to the last assigned subnet. At 1505 a determination is made regarding whether any of the IP addresses for the subnet are allocated. If any of the IP addresses are allocated, the subnet assigned prior to the current subnet is selected at 1510 and then examined at 1505. The process represented by reference numerals 1505 and 1510 continues until a subnet having no allocated IP addresses is found. At 1515 the found subnet is released. This subnet release method ensures applications using the method execute without interruption because a subnet is released only if none of its IP addresses are allocated.

Referring to FIG. 16, at 1600 the number of IP addresses allocated for each subnet assigned to the local pool is determined. At 1605 the subnet having the smallest number of allocated IP addresses is released. This subnet release method provides relatively efficient utilization of IP addresses because subnets having the smallest number of allocated IP address are released, forcing the IP addresses to be allocated among a smaller number of subnets.

Embodiments of the present invention have a number of advantages. Searching for a releasable subnet is simplified since allocating an IP address from earlier-assigned subnets means that releasable subnets tend to be one of the later-assigned subnets. Thus, searching for a releasable subnet beginning with the latest-assigned subnet reduces the number of subnets that need to be searched. Additionally, the same IP address allocation policy means that addresses tend to be allocated from relatively few subnets, thus allowing improved route summarization.

Moreover, grouping allocated addresses in a relatively small number of subnets increases the probability of having a releasable subnet when utilization is low. The released subnet can then be assigned to another part of the network, allowing relatively efficient utilization of the available IP address space.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for on-demand management of Internet Protocol (IP) address pools, the method comprising:
   receiving a first dynamically assigned subnet from a global IP address pool, wherein the global IP address pool maintains a pool of IP addresses for one or more remote domains, the first dynamically assigned subnet specifying a contiguous set of IP addresses and corresponding to one of the one or more remote domains;
storing the first dynamically assigned subnet in a local IP address pool;
receiving a second dynamically assigned subnet, the second dynamically assigned subnet specifying a contiguous set of IP addresses and corresponding to the one of the one or more remote domains;
storing the second dynamically assigned subnet in the local IP address pool;
allocating an IP address from the local IP address pool, wherein the local IP address pool comprises the first and the second dynamically assigned subnets, when a request to connect to the one of the one or more remote domains is received, wherein the allocating is based on a first-assigned subnet policy, in which the IP address is allocated from a least recently assigned subnet in the local IP address pool corresponding to the one of the one or more remote domains and having at least one unallocated IP address, monitoring the local IP address pool utilization, and requesting one or more additional subnets specifying a contiguous set of IP addresses corresponding to the one of the one or more remote domains from the global IP address pool if utilization of the local IP address pool exceeds a first high threshold and releasing one or more subnets from the local IP address pool to the global IP address pool if utilization of the local IP address pool falls below a second low threshold, wherein the requesting one or more additional subnets comprises requesting a subnet having a first predetermined number of IP addresses, wherein the first high and second low thresholds are preconfigured before the one or more additional subnets are requested; and
deallocating the IP address if the IP address is released, wherein the one of the one or more remote domains comprises a virtual private network;
wherein the releasing one or more subnets is based on a last-assigned subnet first policy, in which the one or more subnet that was most recently assigned and stored in the local IP address pool is released first,
wherein the last-assigned subnet first policy further comprises:
releasing the one or more subnets from the local IP address pool by selecting the one or more subnets to be released from subnets having no allocated IP addresses, releasing the one or more subnets based upon a subnet assignment time and releasing the one or more subnets in decreasing order of subnet assignment times;
wherein the releasing one or more subnets further comprises releasing a subnet having a second predetermined number of IP addresses.

2. The method of claim 1 wherein the releasing one or more subnets further comprises deassigning subnets having the smallest number of allocated IP addresses.

3. The method of claim 1, further comprising polling the local IP address pool at predetermined intervals to obtain local IP address pool utilization information.

4. The method of claim 1 wherein the requesting one or more subnets further comprises requesting a subnet having a size that is relative to a current subnet size.

5. The method of claim 4 wherein the deallocating an IP address further comprises deassigning a subnet having a size that is relative to the current subnet size.

6. The method of claim 1 wherein the requesting one or more subnets further comprises requesting a subnet having a size that is relative to an initial subnet size.

7. The method of claim 6 wherein the deallocating an IP address further comprises deassigning a subnet having a size that is relative to the initial subnet size.

8. The method of claim 1 wherein the requesting one or more subnets further comprises requesting a subnet having a size that is relative to a current subnet size.

9. The method of claim 1 wherein the deallocating an IP address further comprises deassigning a subnet having a size that is relative to the current subnet size.

10. The method of claim 1 wherein the releasing one or more subnets further comprises removing the summarized route for the one or more subnets from a routing table associated with the local IP address pool.

11. The method of claim 1 wherein the method further comprises inserting a route summary for the requested one or more subnets if the requested one or more subnets is received.

12. A non-transitory computer readable storage medium storing a program embodying instructions executable by a computer to perform a method for on-demand management of Internet Protocol (IP) address pools, the method comprising:
receiving a first dynamically assigned subnet from a global IP address pool, wherein the global IP address pool maintains a pool of IP addresses for one or more remote domains, the first dynamically assigned subnet specifying a contiguous set of IP addresses and corresponding to if one of the one or more remote domains;
storing the first dynamically assigned subnet in a local IP address pool;
receiving a second dynamically assigned subnet, the second dynamically assigned subnet specifying a contiguous set of IP addresses and corresponding to the one of the one or more remote domains;
storing the second dynamically assigned subnet in the local IP address pool;
allocating an IP address from the local IP address pool, wherein the local IP address pool comprises the first and the second dynamically assigned subnets, when a request to connect to the one of the one or more remote domains is received, wherein the allocating is based on a first-assigned subnet policy, in which the IP address is allocated from a least recently assigned subnet in the local IP address pool corresponding to the one of the one or more remote domains and having at least one unallocated IP address, monitoring the local IP address pool utilization, and requesting one or more additional subnets specifying a contiguous set of IP addresses corresponding to the one of the one or more remote domains from the global IP address pool if utilization of the local IP address pool exceeds a first high threshold and releasing one or more subnets from the local IP address pool to the global IP address pool if utilization of the local IP address pool falls below a second low threshold, wherein the requesting one or more additional subnets comprises requesting a subnet having a first predetermined number of IP addresses, the first high and second low thresholds are preconfigured before the one or more additional subnets are requested; and
deallocating the IP address if the IP address is released, wherein the one of the one or more remote domains comprises a virtual private network;
wherein the releasing one or more subnets is based on a last-assigned subnet first policy, in which the one or more subnets that was most recently assigned and stored in the local IP address pool is released first,
wherein the last-assigned subnet first policy further comprises:

releasing the one or more subnets from the local IP address pool by selecting the one or more subnets to be released from subnets having no allocated IP addresses, releasing the one or more subnets based upon a subnet assignment time and releasing the one or more subnets in decreasing order of subnet assignment times;

wherein the releasing one or more subnets further comprises releasing a subnet having a second predetermined number of IP addresses.

13. The non-transitory computer readable storage medium of claim 12 wherein the releasing one or more subnets further comprises deassigning subnets having the smallest number of allocated IP addresses.

14. The non-transitory computer readable storage medium of claim 12 wherein the method further comprises polling the local IP address pool at predetermined intervals to obtain local IP address pool utilization information.

15. The non-transitory computer readable storage medium of claim 12 wherein the requesting one or more subnets further comprises requesting a subnet having a size that is relative to a current subnet size.

16. The non-transitory computer readable storage medium of claim 15 wherein the deallocating an IP address further comprises deassigning a subnet having a size that is relative to the current subnet size.

17. The non-transitory computer readable storage medium of claim 12 wherein the requesting one or more subnets further comprises requesting a subnet having a size that is relative to an initial subnet size.

18. The non-transitory computer readable storage medium of claim 17 wherein the deallocating an IP address further comprises deassigning a subnet having a size that is relative to the initial subnet size.

19. The non-transitory computer readable storage medium of claim 12 wherein the requesting one or more subnets further comprises requesting a subnet having a size that is relative to a current subnet size.

20. The non-transitory computer readable storage medium of claim 12 wherein the deallocating an IP addresses further comprises deassigning a subnet having a size that is relative to the current subnet size.

21. The non-transitory computer readable storage medium of claim 12 wherein the releasing one or more subnets further comprises removing the summarized route for the one or more subnet from a routing table associated with the local IP address pool.

22. The non-transitory computer readable storage medium of claim 12 wherein the method further comprises inserting a route summary for the requested one or more subnets if the requested one or more subnets is received.

23. A system for on-demand management of Internet Protocol (IP) address pools, the system comprising:

a memory; and a computer processor operably coupled to the memory element for managing IP address pools, including:

means for receiving a first dynamically assigned subnet from a global IP address pool, wherein the global IP address pool maintains a pool of IP addresses for one or more remote domains, the first dynamically assigned subnet specifying a contiguous set of IP addresses and corresponding to one of the one or more remote domains;

means for storing the first dynamically assigned subnet in a local IP address pool;

means for receiving a second dynamically assigned subnet, the second dynamically assigned subnet specifying a contiguous set of IP addresses and corresponding to the one of the one or more remote domains;

means for storing the second dynamically assigned subnet in the local IP address pool;

means for allocating an IP address from the local IP address pool, wherein the local IP address pool comprises the first and the second dynamically assigned subnets, when a request to connect to the one of the one or more remote domains is received, wherein the allocating is based on a first-assigned subnet policy, in which the IP address is allocated from a least recently assigned of any subnets in the local IP address pool having at least one unallocated IP address corresponding to the one of the one or more remote domains, monitoring the local IP address pool utilization, and requesting one or more additional subnets specifying a contiguous set of IP addresses corresponding to the one of the one or more remote domains from the global IP address pool if utilization of the local IP address pool exceeds a first high threshold and releasing one or more subnets from the local IP address pool to the global IP address pool if utilization of the local IP address pool falls below a second low threshold, wherein the requesting one or more additional subnets comprises requesting a subnet having a first predetermined number of IP addresses, wherein the first high and second low thresholds are preconfigured before the one or more additional subnets are requested; and means for deallocating the IP address if the IP address is released, wherein the one of the one or more remote domains comprises a virtual private network;

wherein the releasing one or more subnets is based on a last-assigned subnet first policy, in which the one or more subnet that was most recently assigned and stored in the local IP address pool is released first, wherein the last-assigned subnet first policy further comprises:

releasing the one or more subnets from the local IP address pool by selecting the one or more subnets to be released from subnets having no allocated IP addresses, releasing the one or more subnets based upon a subnet assignment time and releasing the one or more subnets in decreasing order of subnet assignment times;

wherein the releasing one or more subnets further comprises releasing a subnet having a second predetermined number of IP addresses.

24. The system of claim 23 wherein the means for releasing one or more subnets further comprises means for deassigning subnets having the smallest number of allocated IP addresses.

25. The system of claim 23 wherein the system further comprises means for polling the local IP address pool at predetermined intervals to obtain local IP address pool utilization information.

26. The system of claim 23 wherein the means for requesting one or more subnets further comprises means for requesting a subnet having a size that is relative to a current subnet size.

27. The system of claim 26 wherein the means for deallocating an IP address further comprises means for deassigning a subnet having a size that is relative to the current subnet size.

28. The system of claim 23 wherein the means for requesting one or more subnets further comprises means for requesting a subnet having a size that is relative to an initial subnet size.

29. The system of claim 28 wherein the means for deallocating an IP address further comprises means for deassigning a subnet having a size that is relative to the initial subnet size.

30. The system of claim 23 wherein the means for requesting one or more subnets further comprises means for requesting a subnet having a size that is relative to a current subnet size.

31. The system of claim 23 wherein the means for deallocating an IP address further comprises means for deassigning a subnet having a size that is relative to the current subnet size.

32. The system of claim 23 wherein the means for releasing one or more subnets further comprises means for removing the summarized route for the one or more subnets from a routing table associated with the local IP address pool.

33. The system of claim 23, further comprising means for inserting a route summary for the requested one or more subnets if the requested one or more subnets is received.

34. An apparatus for on-demand management of Internet Protocol (IP) address pools, the apparatus comprising:
a memory; and
a computer processor operably coupled to the memory element and operable to execute instructions associated with a local IP address pools manager,
wherein the local IP address pools manager is configured to receive a first dynamically assigned subnet from a global IP address pool, wherein the global IP address pool maintains a pool of IP addresses for one or more remote domains, the first dynamically assigned subnet specifying a contiguous set of IP addresses and corresponding to a one of the one or more remote domains, to store the first dynamically assigned subnet in a local IP address pool, to receive a second dynamically assigned subnet, the second dynamically assigned subnet specifying a contiguous set of IP addresses and corresponding to the one of the one or more remote domains, and to store the second dynamically assigned subnet in the local IP address pool;
wherein the local IP address pools manager contains an IP address allocator configured to allocate an IP address from the local IP address pool, wherein the local IP address pool comprises the first and the second dynamically assigned subnets, when a request to connect to the one of the one or more remote domains is received, wherein the allocating is based on a first-assigned subnet policy, in which the IP address is allocated from a least recently assigned subnet in the local IP address pool corresponding to the one of the one or more remote domains and having at least one unallocated IP address, monitoring the local IP address pool utilization, and requesting one or more additional subnets specifying a contiguous set of IP addresses corresponding to the one of the one or more remote domains from the global IP address pool if utilization of the local IP address pool exceeds a first high threshold and releasing one or more subnets to the global IP address pool if utilization of the local IP address pool falls below a second low threshold, wherein the requesting one or more additional subnets comprises requesting a subnet having a first predetermined number of IP addresses, wherein the first high and second low thresholds are preconfigured before the one or more additional subnets are requested; and
wherein the local IP address pools manager further contains an IP address deallocator configured to deallocate the IP address if the IP address is unused, wherein the one of the one or more remote domains comprises a virtual private network;
wherein the releasing one or more subnets is based on a last-assigned subnet first policy, in which the one or more subnets that was most recently assigned and stored in the local IP address pool is released first,
wherein the last-assigned subnet first policy further comprises:
releasing the one or more subnets from the local IP address pool by selecting the one or more subnets to be released from subnets having no allocated IP addresses, releasing the one or more subnets based upon a subnet assignment time and releasing the one or more subnets in decreasing order of subnet assignment times;
wherein the releasing one or more subnets further comprises releasing a subnet having a second predetermined number of IP addresses.

35. The apparatus of claim 34 wherein the apparatus further comprises:
a utilization assessor to assess local IP address utilization;
a subnet requester to request one or more subnets based upon a first signal from the utilization assessor;
a subnet receiver to receive the one or more subnets requested by the subnet requester; and
a subnet returner to return one or more subnets based upon a second signal from the utilization assessor.

36. The apparatus of claim 34 wherein the subnet returner is further configured to release subnets having the smallest number of allocated IP addresses.

37. The apparatus of claim 34 wherein the subnet requester is further configured to request a subnet having a size that is relative to a current subnet size.

38. The apparatus of claim 37 wherein the subnet returner is further configured to deassign a subnet having a size that is relative to the current subnet size.

39. The apparatus of claim 34 wherein the subnet requester is further configured to request a subnet having a size that is relative to an initial subnet size.

40. The apparatus of claim 37 wherein the subnet returner is further configured to release a subnet having a size that is relative to the initial subnet size.

41. The apparatus of claim 34 wherein the subnet requester is further configured to request a subnet having a size that is relative to a current subnet size.

42. The apparatus of claim 34 wherein the subnet returner is further configured to deassign a subnet having a size that is relative to the current subnet size.

43. The apparatus of claim 34 wherein the apparatus is further configured to remove the summarized route for the one or more subnets from a routing table associated with the local IP address pool if the one or more subnets is deassigned.

44. The apparatus of claim 34 wherein the apparatus is further configured to insert a route summary for the requested one or more subnets if the subnet receiver receives the requested one or more subnets.

45. The apparatus of claim 34 wherein
the global IP address pool comprises an Authentication, Authorization and Accounting (AAA) server coupled to a global IP address interface to communicate with the AAA server using the RADIUS protocol.

46. The apparatus of claim 34 wherein
the global IP address pool comprises a Dynamic Host Configuration Protocol (DHCP) server coupled to a global IP address to communicate with the DHCP server using the DHCP protocol.

* * * * *